US012543649B2

(12) United States Patent
Yang et al.

(10) Patent No.: US 12,543,649 B2
(45) Date of Patent: Feb. 10, 2026

(54) RIDING LAWN MOWER

(71) Applicant: Nanjing Chervon Industry Co., Ltd., Nanjing (CN)

(72) Inventors: Dezhong Yang, Nanjing (CN); Yangzi Liu, Nanjing (CN); Li Li, Nanjing (CN); Ju Li, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 883 days.

(21) Appl. No.: 17/835,527

(22) Filed: Jun. 8, 2022

(65) Prior Publication Data

US 2022/0410762 A1 Dec. 29, 2022

(30) Foreign Application Priority Data

Jun. 25, 2021 (CN) .......................... 202110714441.8

(51) Int. Cl.
*A01D 69/02* (2006.01)
*A01D 34/00* (2006.01)
(Continued)

(52) U.S. Cl.
CPC ........... *A01D 69/02* (2013.01); *A01D 34/001* (2013.01); *A01D 34/64* (2013.01); *A01D 34/78* (2013.01);
(Continued)

(58) Field of Classification Search
CPC ........ A01D 69/02; A01D 34/64; A01D 34/78; A01D 2101/00; B60L 53/60; B60L 58/18
See application file for complete search history.

(56) References Cited

U.S. PATENT DOCUMENTS 3,732,671 A 5/1973 Allen
3,823,367 A 7/1974 Kaye
(Continued)

FOREIGN PATENT DOCUMENTS

CN 102388720 A 3/2012
CN 102422750 A 4/2012
(Continued)

OTHER PUBLICATIONS

EPO, partial European search report issued on European patent application No. 22178263.4, dated Nov. 25, 2022, 11 pages.
(Continued)

*Primary Examiner* — Brian L Swenson
(74) *Attorney, Agent, or Firm* — Greenberg Traurig, LLP

(57) ABSTRACT

A riding lawn mower, including: a frame; a seat; a walking assembly and a walking motor; a cutting assembly and a driving motor configured to drive the cutting assembly; a first energy storage device and a second energy storage device configured to supply power to at least one of the walking motor or the driving motor; a driving circuit to transfer power from at least one of the energy storage devices to at least one of the motors; and a charging circuit to charge at least one of the energy storage devices. The riding lawn mower further includes a first identification terminal engageable with the second energy storage device and a second identification terminal engageable with the first energy storage device; the riding lawn mower identifies a type of the energy storage devices through the identification terminals and selectively connects them to the driving circuit and the charging circuit.

29 Claims, 14 Drawing Sheets

(51) Int. Cl.

| | | |
|---|---|---|
| *A01D 34/64* | (2006.01) | |
| *A01D 34/78* | (2006.01) | |
| *B60L 50/60* | (2019.01) | |
| *B60L 50/64* | (2019.01) | |
| *B60L 53/53* | (2019.01) | |
| *B60L 53/60* | (2019.01) | |
| *B60L 58/18* | (2019.01) | |
| *H01G 11/34* | (2013.01) | |
| *H01M 10/42* | (2006.01) | |
| *H01M 10/44* | (2006.01) | |
| *H01M 10/46* | (2006.01) | |
| *H01M 50/209* | (2021.01) | |
| *H01M 50/213* | (2021.01) | |
| *H01M 50/247* | (2021.01) | |
| *H01M 50/249* | (2021.01) | |
| *H01M 50/562* | (2021.01) | |
| *H02J 7/00* | (2006.01) | |
| *A01D 101/00* | (2006.01) | |
| *H01M 10/052* | (2010.01) | |

(52) U.S. Cl.
CPC ............ *B60L 50/64* (2019.02); *B60L 50/66* (2019.02); *B60L 53/53* (2019.02); *B60L 53/60* (2019.02); *B60L 58/18* (2019.02); *H01G 11/34* (2013.01); *H01M 10/4221* (2013.01); *H01M 10/441* (2013.01); *H01M 10/46* (2013.01); *H01M 50/209* (2021.01); *H01M 50/213* (2021.01); *H01M 50/247* (2021.01); *H01M 50/249* (2021.01); *H01M 50/562* (2021.01); *H02J 7/0013* (2013.01); *H02J 7/0063* (2013.01); *A01D 2101/00* (2013.01); *B60L 2200/22* (2013.01); *B60L 2200/40* (2013.01); *H01M 10/052* (2013.01); *H01M 2220/20* (2013.01); *H01M 2220/30* (2013.01); *H02J 2207/20* (2020.01)

(56) References Cited

U.S. PATENT DOCUMENTS

| | | | |
|---|---|---|---|
| 3,850,259 A * | 11/1974 | Ikeda | B62D 57/022 180/8.6 |
| 4,876,846 A | 10/1989 | Torras | |
| 5,540,037 A | 7/1996 | Lamb et al. | |
| 5,727,372 A | 3/1998 | Kanitz | |
| 5,794,422 A | 8/1998 | Reimers | |
| 5,809,756 A | 9/1998 | Scag | |
| 5,934,053 A | 8/1999 | Fillman | |
| 5,946,894 A | 9/1999 | Eavenson | |
| 6,082,082 A | 7/2000 | Hunter | |
| 6,082,084 A | 7/2000 | Reimers | |
| 6,490,849 B1 | 12/2002 | Scag | |
| 6,571,542 B1 | 6/2003 | Fillman | |
| 6,591,593 B1 | 7/2003 | Brandon | |
| 6,688,089 B2 | 2/2004 | Velke | |
| 6,826,895 B2 | 12/2004 | Lida et al. | |
| 6,856,895 B2 | 2/2005 | Hashida | |
| 7,392,869 B2 | 7/2008 | Carlson | |
| 7,578,116 B1 | 8/2009 | Howell | |
| 7,594,377 B1 | 9/2009 | Jansen | |
| 7,596,636 B2 | 9/2009 | Gormley | |
| 7,610,975 B1 | 11/2009 | Gust | |
| 7,610,986 B2 | 11/2009 | Ohashi | |
| 7,661,486 B2 | 2/2010 | Turner | |
| 7,673,712 B2 | 3/2010 | Iida | |
| 7,686,108 B2 | 3/2010 | Piontek | |
| 7,712,294 B2 | 5/2010 | Wright | |
| 7,721,517 B2 | 5/2010 | Hunt | |
| 7,731,398 B2 | 6/2010 | Probasco | |
| 7,735,592 B2 | 6/2010 | Bellot | |
| 8,191,342 B2 | 6/2012 | Ishii | |
| 8,429,885 B2 | 4/2013 | Rosa | |
| 8,572,939 B2 | 11/2013 | Koike | |
| 8,653,786 B2 | 2/2014 | Baetica | |
| 8,794,660 B1 | 8/2014 | Stover | |
| 9,010,077 B2 | 4/2015 | Elder | |
| 9,210,839 B2 | 12/2015 | Schygge | |
| 9,226,444 B2 | 1/2016 | Schygge | |
| 9,282,695 B2 | 3/2016 | Goto | |
| 9,296,306 B2 | 3/2016 | Schygge | |
| 9,357,695 B2 | 6/2016 | Higashikawa | |
| 9,535,695 B2 | 1/2017 | Mylius | |
| 9,686,909 B2 | 6/2017 | Schygge | |
| 9,699,965 B2 | 7/2017 | Schygge | |
| 9,705,332 B2 | 7/2017 | Oudalov | |
| 9,711,767 B2 | 7/2017 | Juenger | |
| 9,867,331 B1 | 1/2018 | Siudyla | |
| 9,949,436 B2 | 4/2018 | Ito | |
| 10,029,551 B2 | 7/2018 | Ito | |
| 10,093,169 B1 | 10/2018 | Keller | |
| 10,868,435 B2 | 12/2020 | Hoppel | |
| 10,980,173 B2 | 4/2021 | Becke et al. | |
| 11,081,893 B2 | 8/2021 | Chow | |
| 11,653,598 B2 | 5/2023 | Liu | |
| 11,696,531 B2 | 7/2023 | Liu | |
| 11,839,177 B2 | 12/2023 | Liu | |
| 11,839,178 B2 | 12/2023 | Liu | |
| 11,910,752 B2 | 2/2024 | Liu | |
| 11,917,945 B2 | 3/2024 | Yang | |
| 2003/0029149 A1 | 2/2003 | Fillman | |
| 2004/0050026 A1 | 3/2004 | Heal et al. | |
| 2006/0058897 A1 | 3/2006 | Senda | |
| 2006/0059879 A1 | 3/2006 | Edmond | |
| 2006/0059880 A1 | 3/2006 | Angott | |
| 2006/0091858 A1 | 5/2006 | Johnson | |
| 2007/0125054 A1 | 6/2007 | Dong et al. | |
| 2007/0125056 A1 | 6/2007 | Edmond | |
| 2008/0034722 A1 | 2/2008 | Wright | |
| 2008/0264026 A1 | 10/2008 | Ishii et al. | |
| 2009/0260901 A1 | 10/2009 | Ishii | |
| 2011/0289896 A1 | 12/2011 | Sasahara | |
| 2012/0235642 A1 | 9/2012 | Mao | |
| 2012/0238403 A1 | 9/2012 | Koike | |
| 2013/0014966 A1 | 1/2013 | Tozawa | |
| 2013/0097984 A1 | 4/2013 | Elder | |
| 2014/0015451 A1 | 1/2014 | Funabashi et al. | |
| 2014/0144117 A1 | 5/2014 | Schygge | |
| 2014/0144177 A1 | 5/2014 | Stallman | |
| 2014/0165524 A1 | 6/2014 | Schygge | |
| 2014/0244090 A1 | 8/2014 | Schygge | |
| 2014/0259804 A1 | 9/2014 | Eavenson, Sr. | |
| 2015/0240773 A1 | 8/2015 | Koenen et al. | |
| 2015/0359174 A1 | 12/2015 | Ito | |
| 2015/0366130 A1 | 12/2015 | Bergström | |
| 2016/0014954 A1 | 1/2016 | Dwyer | |
| 2016/0183451 A1 | 6/2016 | Conrad | |
| 2016/0198630 A1 | 7/2016 | Skoog | |
| 2016/0242356 A1 | 8/2016 | Verderman et al. | |
| 2016/0338266 A1 | 11/2016 | Yamaoka | |
| 2017/0055443 A1 | 3/2017 | Fujii | |
| 2017/0136864 A1 | 5/2017 | Ito | |
| 2017/0196164 A1 | 7/2017 | Bryant | |
| 2017/0263914 A1 | 9/2017 | Ito | |
| 2017/0265381 A1 | 9/2017 | Kuriyagawa | |
| 2017/0335818 A1 | 11/2017 | Dwyer | |
| 2017/0366817 A1 | 12/2017 | Hashimoto | |
| 2019/0075724 A1 | 3/2019 | Becke et al. | |
| 2019/0160972 A1 | 5/2019 | Zeiler | |
| 2020/0170184 A1 | 6/2020 | Velderman | |
| 2020/0267903 A1 | 8/2020 | Gao | |
| 2020/0315095 A1 | 10/2020 | Liu et al. | |
| 2022/0408648 A1 | 12/2022 | Yang | |
| 2022/0408649 A1 | 12/2022 | Yang | |
| 2023/0202314 A1 | 6/2023 | Yang | |

FOREIGN PATENT DOCUMENTS

| | | |
|---|---|---|
| CN | 103053265 B | 4/2013 |
| CN | 103125212 A | 6/2013 |
| CN | 102422750 B | 7/2013 |

(56) References Cited

FOREIGN PATENT DOCUMENTS

| | | |
|---|---|---|
| CN | 103518487 A | 1/2014 |
| CN | 203423971 U | 2/2014 |
| CN | 103813918 A | 5/2014 |
| CN | 103970039 A | 8/2014 |
| CN | 105850340 A | 8/2016 |
| CN | 106471990 A | 3/2017 |
| CN | 206260323 U | 6/2017 |
| CN | 107205337 A | 9/2017 |
| CN | 109557910 A | 4/2019 |
| CN | 209710730 U | 12/2019 |
| DE | 212015000289 U1 | 7/2017 |
| EP | 0262285 B1 | 8/1991 |
| EP | 2110295 B1 | 2/2012 |
| EP | 2543244 A1 | 1/2013 |
| EP | 2724604 A1 | 4/2014 |
| EP | 2793346 | 10/2014 |
| EP | 2534938 B1 | 10/2015 |
| EP | 3219188 | 9/2017 |
| EP | 3079182 B1 | 9/2018 |
| FR | 2252802 B1 | 10/1976 |
| WO | 9520868 W | 8/1995 |
| WO | 2013009325 A1 | 1/2013 |
| WO | 2013/102023 A1 | 7/2013 |
| WO | 2016074239 A1 | 5/2016 |
| WO | 2016094475 A2 | 6/2016 |
| WO | 2016109860 A2 | 7/2016 |
| WO | 2017013602 A1 | 1/2017 |
| WO | 2017145093 A1 | 8/2017 |
| WO | 2017173944 A1 | 10/2017 |
| WO | 2018031719 A1 | 2/2018 |
| WO | 2018102338 A1 | 6/2018 |
| WO | 2020/147841 A1 | 7/2020 |

OTHER PUBLICATIONS

Office Action from Canadian application number 3,165,100, dated Sep. 21, 2023, 10 pp.
Office Action from Canadian application No. 3,193,671, dated Jun. 28, 2024, 7 pp.
Non-final Office Action from U.S. Appl. No. 18/170,817, dated Jun. 16, 2023, 13 pp.
Non-final Office Action from U.S. Appl. No. 18/191,590, dated Jun. 14, 2023, 11 pp.
Non-final Office Action from U.S. Appl. No. 18/191,698, dated Jun. 14, 2023, 13 pp.
Non-final Office Action from U.S. Appl. No. 18/191,776, dated Jun. 15, 2023, 11 pp.
Office Action from EP application No. 22151071.2, dated Sep. 13, 2023, 7 pp.
Non-final office action from U.S. Appl. No. 18/409,050, dated Dec. 13, 2024, 10 pp.
Non-final office action from U.S. Appl. No. 18/426,632, dated Dec. 20, 2024, 16 pp.
Non-final office action from U.S. Appl. No. 18/426,711, dated Dec. 20, 2024, 12 pp.
Non-final office action from U.S. Appl. No. 18/426,936, dated Dec. 20, 2024, 12 pp.
Communication pursuant to Rule 114(2) EPC for EP application No. 22151071.2, dated May 12, 2023, 2 pp.
Information About the Result of Oral Proceedings held on Oct. 16, 2024 of EP application No. 18894932.5, dated Nov. 14, 2024, 19 pp.
Non-final Office Action from U.S. Appl. No. 18/185,502, dated Nov. 12, 2024, 7 pp.
Non-final Office Action from U.S. Appl. No. 18/451,894, dated Nov. 22, 2024, 7 pp.
Office Action from Canadian application No. 3,165,100, dated Apr. 18, 2024, 9 pp.
ISA/CN, International Search Report issued on PCT application No. CN2018/123856, dated Mar. 22, 2019, 4 pages.
ISA/CN, English translation of International Search Report issued on PCT application No. CN2018/123856, dated Mar. 22, 2019, 2 pages.
ISA/CN, Written Opinion issued on PCT application No. CN2018/123856, dated Mar. 22, 2019, 3 pages.
ISA/CN, English translation of Written Opinion issued on PCT application No. CN2018/123856, dated Mar. 22, 2019, 4 pages.
EPO, extended European Search Report issued on European patent application No. 18894932.5, dated Dec. 8, 2020, 3 pages.
EPO, extended European Search Report issued on European patent publication No. 3827659A1, dated Aug. 24, 2021, 8 pages.
CIPO, office action issued on Canadian patent application No. 3,087,294, dated Sep. 26, 2022, 3 pages.
USPTO, non-final office action issued on U.S. Appl. No. 17/825,298, dated Aug. 5, 2022, 13 pages.
USPTO, non-final office action issued on U.S. Appl. No. 16/909,549, dated Jul. 8, 2022, 14 pages.
ISA/CN, Int. Search Report issued on PCT application No. PCT/CN2022/098357, dated Sep. 21, 2022, 5 pages.
ISA/CN, English translation of Int. Search Report issued on PCT application No. PCT/CN2022/098357, dated Sep. 21, 2022, 4 pages.
ISA/CN, Written Opinion issued on PCT application No. PCT/CN2022/098357, dated Sep. 21, 2022, 3 pages.
ISA/CN, English translation of Written Opinion issued on PCT application No. PCT/CN2022/098357, dated Sep. 21, 2022, 3 pages.

* cited by examiner

RIDING LAWN MOWER

RELATED APPLICATION INFORMATION

This application claims the benefit of CN 202110714441.8, filed Jun. 25, 2021, the disclosure of which is incorporated herein in its entirety.

TECHNICAL FIELD

The disclosure relates to an outdoor walking equipment, in particular to a riding lawn mower.

BACKGROUND

Outdoor walking equipment is used for working outdoors. For example: multi-purpose vehicles, agricultural machinery vehicles, farmer's vehicles, ATVs, golf carts, riding lawn mowers, etc. When operating outdoors, the equipment needs to carry some energy storage devices. Existing energy storage devices for outdoor walking equipment can be basically divided into two categories, one of which uses gasoline, diesel and other fuels as energy storage devices, and the other uses electrical energy storage devices as energy storage devices. Compared with fuel, electrical energy storage devices are more environmentally friendly and more energy-efficient, so they have been favored by users and manufacturers in recent years.

However, the existing electric energy storage device for outdoor walking equipment usually uses a built-in fixed battery as the energy storage device, and such an energy storage device limits the maximum energy storage capacity of the outdoor walking equipment. Especially for professional users, the function of outdoor walking equipment is too simplex, which cannot meet the need to work outdoors for a long time and the need of diverse working contents of the professional users.

For example, the riding lawn mowers are widely used in mowing lawns and vegetation as a garden tool. Professional users not only need to mow lawns during work, but also need to trim branches, trim weeds next to bushes, blow leaves, etc. The energy storage device carried by riding lawn mowers cannot meet the energy requirements and operational requirements of users to deal with so many affairs. However, if only some detachable batteries are installed on the riding lawn mower, these detachable batteries are large in size and high in cost, and the energy stored cannot meet the requirements for the large outdoor walking equipment to work outdoors for a long time.

It should be noted that the content described in the background of the present application does not represent the prior art.

SUMMARY

In order to solve the deficiencies of the prior art, an outdoor walking device is provided. The outdoor walking device can handle various jobs more flexibly and conveniently, and thus satisfy users' need of working outdoors for a long time.

DETAILED DESCRIPTION

The present disclosure will be described in detail below with reference to the accompanying drawings and specific embodiments.

In the description of the present application, it is to be noted that orientations or position relations indicated by terms such as "upper", "lower", "front", "rear", "left" and "right" are those based on the drawings or those in which products of the present application are usually placed when used. These orientations or position relations are intended only to facilitate and simplify the description of the present application and not to indicate or imply that a device or element referred to must have such particular orientations and must be configured or operated in such particular orientations. Thus, these orientations or position relations are not to be construed as limiting the present application.

The present disclosure will be described in detail below with reference to the accompanying drawings and specific embodiments.

Figure 1:
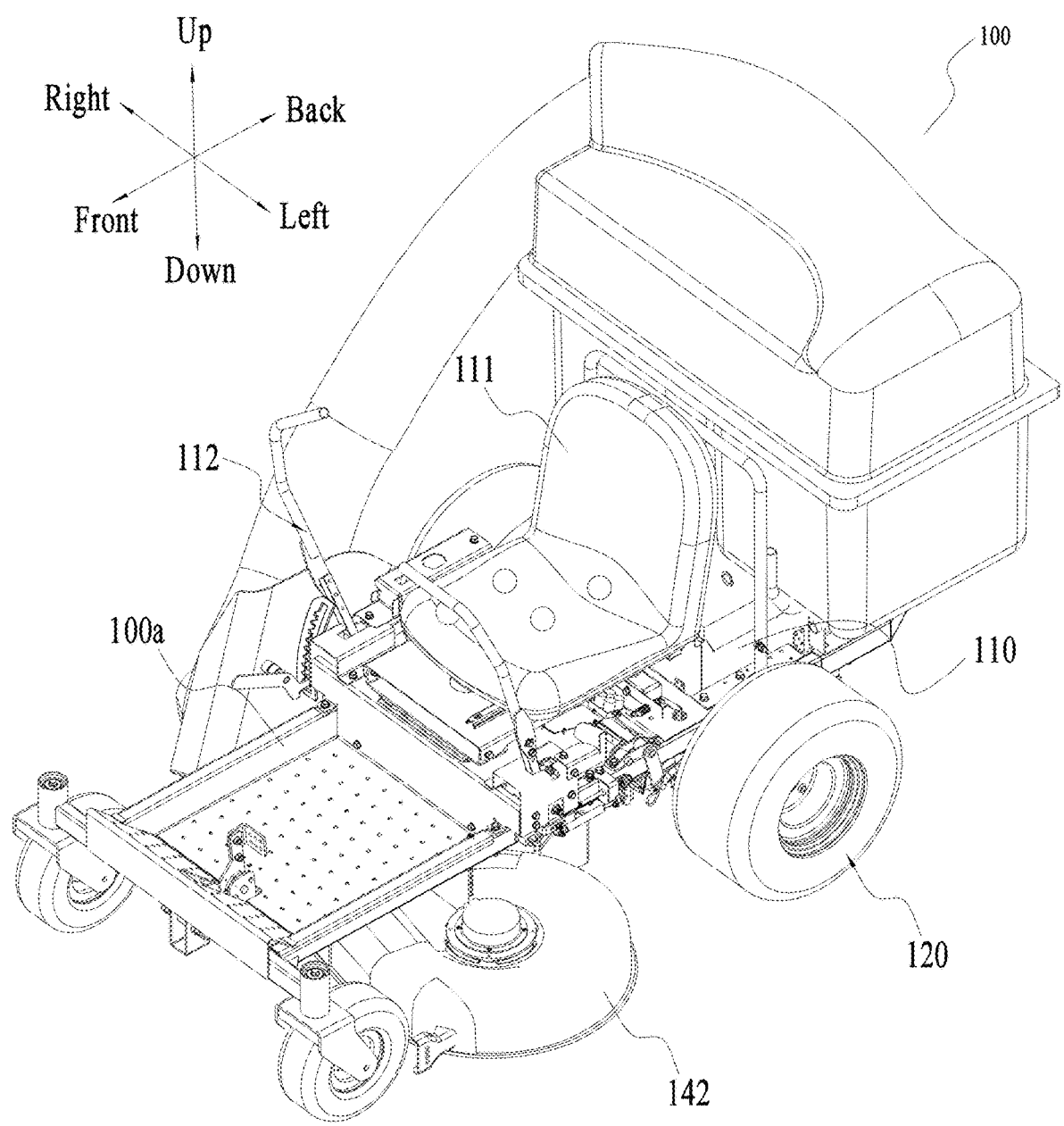
FIG. 1 is a perspective view of an outdoor walking equipment according to an embodiment of the present disclosure.
Figure 19:
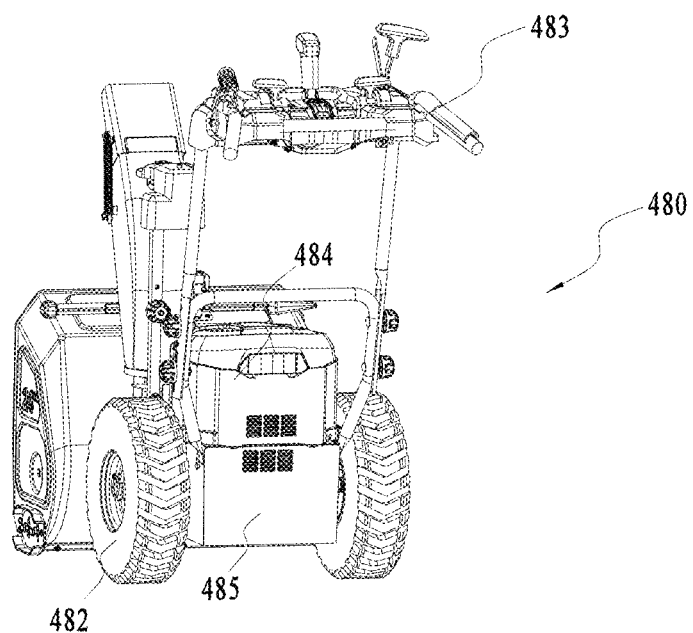
FIG. 19 is a perspective view of a snow plow according to another embodiment.

According to FIG. 1, the present disclosure provides an outdoor tool equipment, the outdoor tool equipment is, in particular, an outdoor walking equipment 100. The outdoor walking equipment 100 is, in particular, a riding lawn mower, and the riding lawn mower can be used outdoors for walking and mowing. It can be understood that the outdoor walking equipment can also be those vehicles that are only for outdoor walking, such as a multi-purpose vehicle shown in FIG. 20, as well as an all terrain vehicle, a farmer's vehicle, a golf cart, and so on. The outdoor walking equipment can also be a vehicle that can realize another function in addition to the walking function, which is like the riding lawn mower shown in this embodiment. As shown in FIG. 19, the outdoor walking equipment can be a snow plow which can not only walk outdoors, but also sweep snow. The outdoor walking equipment can also be an agricultural machinery vehicle, such as a harvester, a spraying vehicle, etc. Definitely, it can be understood that as for the outdoor tool equipment, a washing machine shown in FIG. 21 is also included.

In fact, the outdoor walking equipment that adopts the essential content of the technical solutions introduced in the present disclosure below all fall into the protection scope of the present disclosure.

Figure 2:
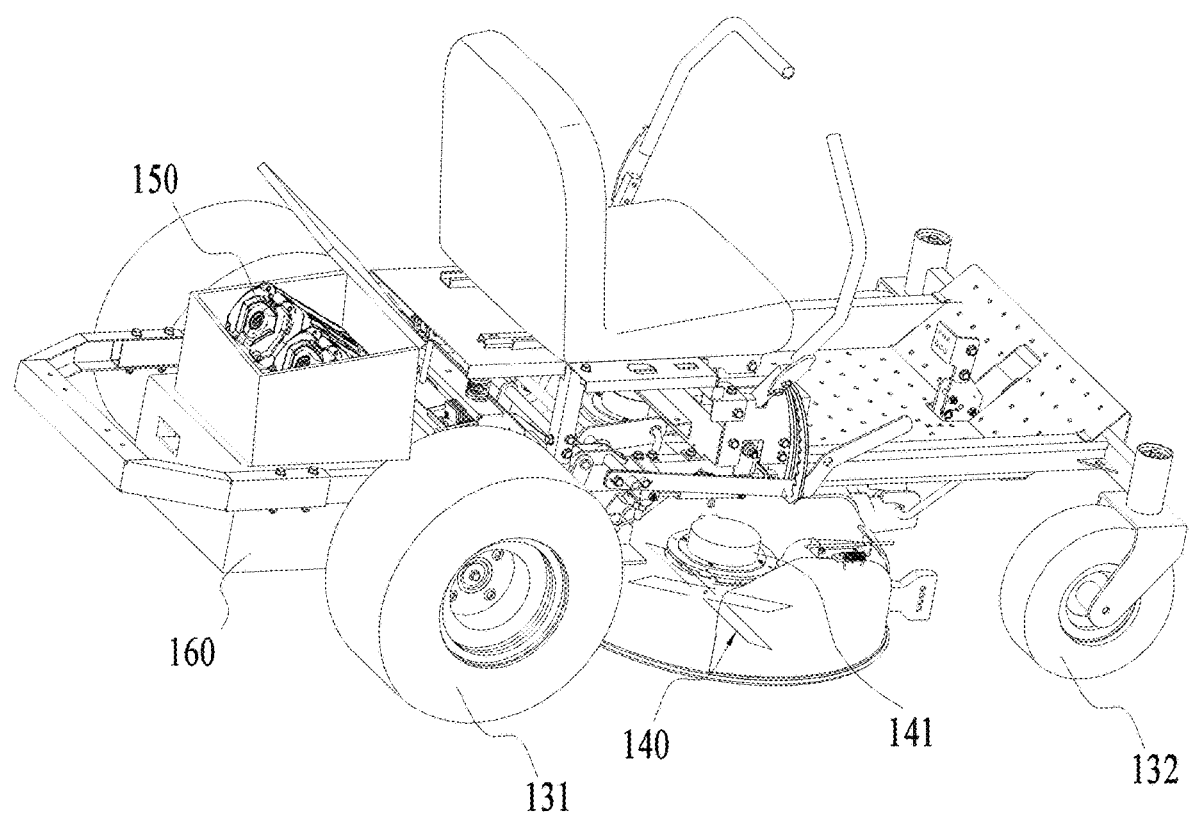
FIG. 2 is a perspective view of partial structure of the outdoor walking equipment in FIG. 1.
Figure 3A:
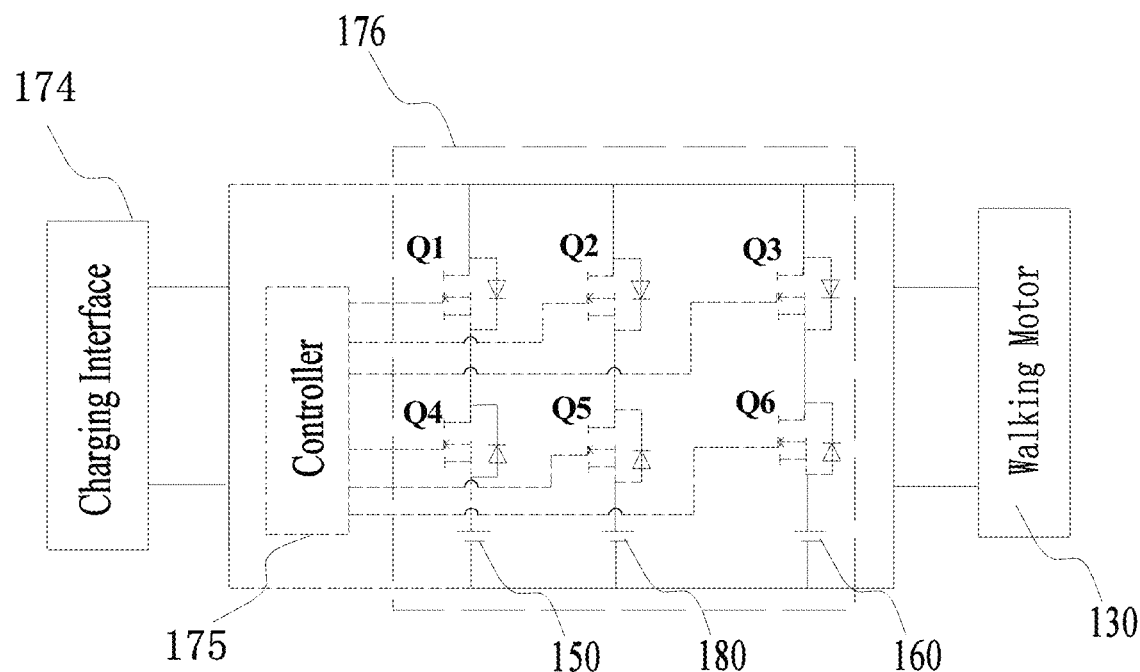
FIG. 3A is a circuit diagram of the outdoor walking equipment in FIG. 1.

As shown in FIGS. 1 to 3, the outdoor walking equipment 100 includes a body 100a and a walking assembly 120. The body 100a further includes a housing 110 and a walking motor 130, and the walking assembly 120 is connected to the body 100a to support the body 100a. The walking assembly 120 can drive the outdoor walking equipment 100 to walk at least in the directions of front and rear. The walking assembly 120 includes a rear walking wheel 131 and a front walking wheel 132. The walking motor 130 drives the rear walking wheel 131 or the front walking wheel 132 to rotate so as to make the outdoor walking equipment 100 to walk on the ground. The number of walking motors 130 may also be two. The two walking motors 130 drive two rear walking wheels 131 respectively, so that the outdoor walking equipment 100 can turn to other directions deviating from the directions of front and rear.

The outdoor walking equipment 100 further includes a functional assembly 140 for realizing a tool function and a driving motor 141 for driving the functional assembly 140. In this embodiment, the outdoor walking equipment 100 is a riding lawn mower, and the functional assembly 140 is specifically a cutting assembly. The cutting assembly includes a cutting piece for mowing, and the driving motor 141 drives the cutting piece to rotate.

Referring to FIG. 1, the outdoor walking device 100 may be used for a user to ride. The user can control the outdoor walking equipment 100 to walk and operate the outdoor walking equipment 100 to cut grass and vegetation at the same time. The outdoor walking equipment 100 also includes a seat 111 on which the user rides. The seat 111 is mounted to the housing 110, and the seat 111 is for the user to sit on. In this embodiment, the riding lawn mower includes an operating assembly, which is specifically an operating lever assembly 112. The operating lever assembly 112 is operated by the user to control the riding lawn mower to move forward, move backward and take a turn.

Referring to FIG. 2, the outdoor walking equipment 100 further includes a first energy storage device 150 and a second energy storage device 160. Both the first energy storage device 150 and the second energy storage device 160 can supply power to the outdoor walking equipment 100. As shown in FIGS. 2 to 6, the first energy storage device 150 includes at least one first energy storage unit 151. The second energy storage device 160 includes at least one second energy storage unit 161. The first energy storage device 150 is connected to the housing 110 in a first installation method, which enables the first energy storage device 150 to be detachably mounted to the housing 110. For example, in this embodiment, the first energy storage device 150 includes a battery pack 152 which is detachably mounted to the housing 110. The second energy storage device 160 is connected to the housing 110 in a second installation method that is different from the first installation method. The second installation method is different from the first installation method. The first installation method enables the first energy storage device 150 to be detachably installed on the housing 110. Specifically, the battery pack 152 is pluggably installed on the housing 110. The battery pack 152 includes a battery pack housing 152a and a first energy storage unit 151 disposed on the battery pack housing 152a. The first energy storage unit 151 may specifically be a battery cell unit that is cylindrical. The battery pack housing 152a is provided with a battery pack interface 152b which enables the battery pack 152 to be pluggable mounted to the housing 110. A body interface 110a corresponding to the battery pack interface 152b is formed on the housing 110. The cooperation of the battery pack interface 152b and the body interface 110a enables the battery pack 152 not only to form a mechanical connection with the body 100a but also to form an electrical connection between the battery pack 152 and the body 100a. The battery pack interface 152b is also provided with a sliding rail 152c which guides the battery pack 152 to be slidably installed on the housing 110.

The second energy storage device 160 is connected to the housing 110 in the second installation method. The second installation method is different from the first installation method. The first energy storage device 150 is detachably installed to the housing, while the second energy storage device 160 can be installed to the housing in a fixed mounting method other than the detachable installation. Of course, it should be noted that using the second installation method does not mean that the second energy storage device 160 is unable to be detachably installed to the housing 110. Specifically, both the first energy storage device 150 and the second energy storage device 160 can be detachably installed to the housing 110. However, the first energy storage device 150 is installed to the housing 110 in a plug-in method, but the second energy storage device 160 is installed to the housing 110 in a detachable connection method different from the plug-in method. For example, the second energy storage device 160 is detachably installed to the housing 110 in a snap-on connection method. At this time, it can also be considered that the plug-in method of the first energy storage device 150 and the snap-on method of the second energy storage device 160 are different. That is to say, the first installation method of the first energy storage device 150 and the second installation method of the second energy storage device 160 are also different.

In this embodiment, the second installation method enables the second energy storage device 160 to be fixedly installed to the housing 110. The second energy storage device 160 is configured to be fixedly mounted to the housing 110, and the fixed connection method here includes, but is not limited to, welding, screw connection, snap connection or immovable connection. When the second energy storage device 160 is fixedly installed to the housing 110, the second energy storage device 160 may not be disassembled or may be disassembled by the user from the housing 110 with an external tool so as to facilitate the maintenance to the second energy storage device 160.

The outdoor walking equipment 100 further includes a connecting assembly, through which the second energy storage device 160 is fixedly connected to the housing 110.

Figure 8:
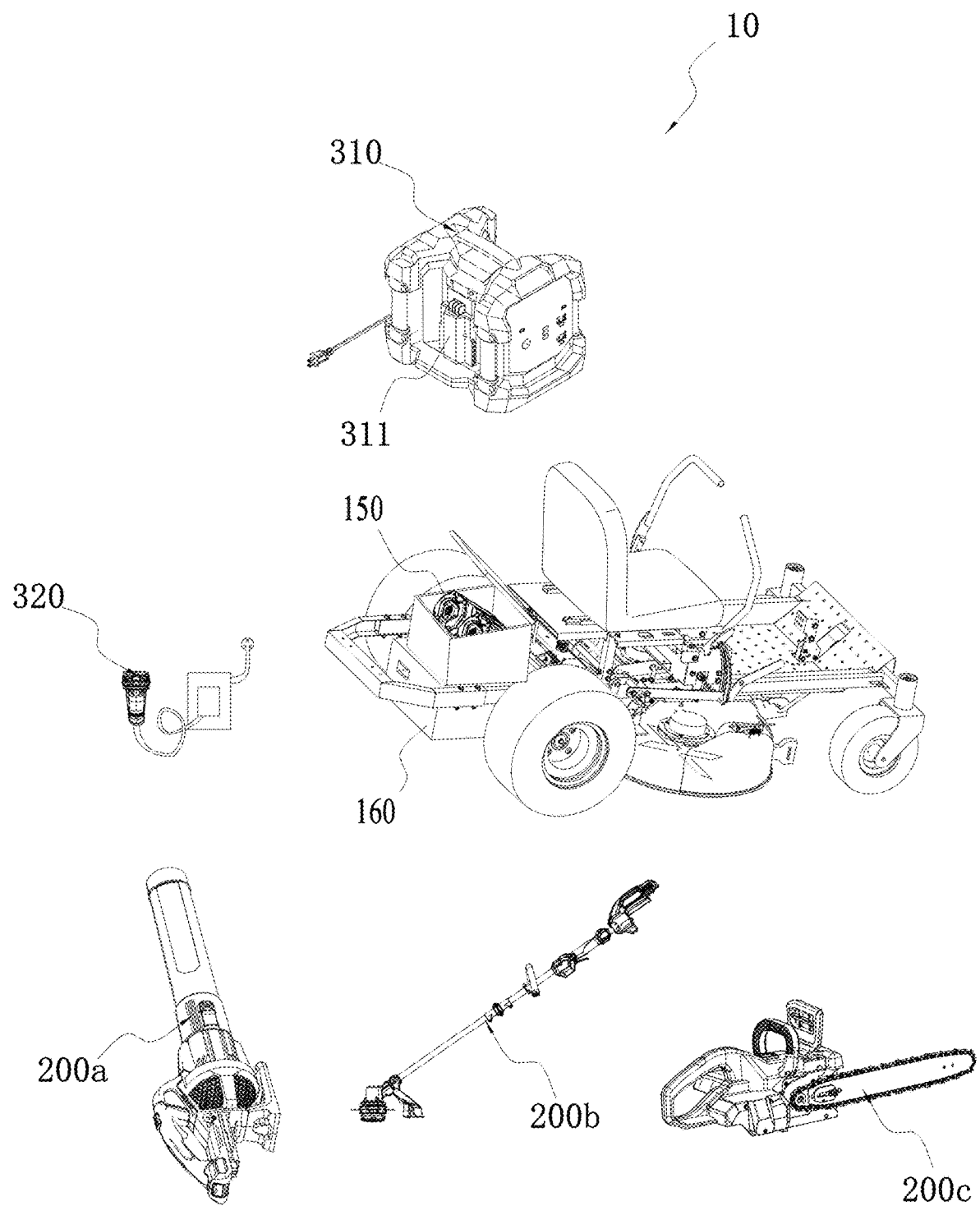
FIG. 8 is a perspective view of a tool system according to an embodiment of the present disclosure.

The connecting assembly may include a fastening element such as screw. Compared to the fixed connection between the second energy storage device 160 and the housing 110, the first energy storage device 150 is detachably installed to the housing 110, and the first energy storage device 150 is also configured to be detachable from the housing 110 so as to supply power to another power tool. The second energy storage device 160 can be specially used as the energy storage device of the outdoor walking equipment 100. In this case, as for these relatively large outdoor walking equipment 100 which needs to work outdoors for a long time and has a relatively large energy consumed per unit time, the second energy storage device 160 can store a relatively large amount of energy to supply power to the outdoor walking equipment 100. The second energy storage device 160 is fixedly installed to the housing, and the shape of the second energy storage device 160 can be more suitable for the outdoor walking equipment 100 than the shape of the first energy storage device 150, thereby making the second energy storage device 160 more compact. The space occupancy rate of the second energy storage unit 161 in the second energy storage device 160 may be set higher, so that the second energy storage device 160 may have larger energy. The first energy storage device 150 includes a battery pack 152 that is detachably mounted to the housing 110. The battery pack 152 can be configured to be adapted to a power tool different from the outdoor walking equipment 100. For example, the power tool can be a blower 200a as shown in FIG. 8. In addition to the second energy storage device 160, the outdoor walking equipment 100 also includes a first energy storage device 150. The first energy storage device 150 can extend the working time of the outdoor walking equipment 100 and may be adapted to other power tools. Therefore, when the power of the first energy storage device 150 of the outdoor walking equipment 100 is temporarily insufficient, the outdoor walking equipment 100 can be supplemented with the power supply devices of other power tools. At the same time, the first energy storage device 150 is configured to be detachably mounted on the housing 110, so that when the user needs to perform various operations outdoors, other power tools in addition to the outdoor walking equipment 100 may need to be used for work. For example, when using the blower 200a to blow off the weeds or fallen leaves that have been trimmed, then the first energy storage device on the outdoor walking equipment 100 can be used to supply power to the blower 200a. In this way, the working flexibility of the outdoor walking equipment is improved, the situations for professional garden staff to deal with various working outdoors is in convenience, the working time of outdoor work is extended, and the work efficiency is improved.

The battery pack 152 in the present disclosure can be applied not only to the outdoor walking equipment 100, but also to other power tools, thereby improving the adaptability of the battery pack 152 and the ability of the outdoor walking equipment 100 to adapt to the battery pack 152 of other power tools. In this way, when the outdoor walking equipment 100 is not in use, the user can of course remove the battery pack 152 to apply to other power tools, thereby avoiding waste of resources and reducing usage costs. In other words, when the user needs to use the outdoor walking equipment 100, the user can of course borrow the battery pack 152 in other power tools as an energy source. The battery pack 152 includes a plurality of battery cells connected in series, in parallel, or in a combination of series and parallel. A plurality of battery cells are combined in one battery housing 152a to form a whole, and the battery cells may be lithium battery cells in particular. As shown in FIG. 8, the power tool may be the blower 200a, and a garden tool such as a lawn mower 200b, a chainsaw 200c, etc. The power tools can also be torque output tools such as electric drills and electric hammers, sawing tools such as electric circular saws, jigsaws, and reciprocating saws, and grinding tools such as angle grinders and sanders. Of course, in other embodiments, the battery pack may also be configured to supply power for a hand-push power tool, such as a walk-behind lawn mower, a walk-behind snow plow and so on. Of course, in other embodiments, the power tool can also supply power to other power tools, such as lights. In this way, the battery pack 152 of the present disclosure adapted to the outdoor walking equipment 100 can be unplugged by the user to be applied to the above power tools. That is to say, the user can borrow the battery pack 152 in those power tools as an energy source to power supply for the outdoor walking equipment 100, so as to improve the versatility of the outdoor walking equipment 100 and reduces the use cost.

In this embodiment, the total energy of the second energy storage device 160 is greater than the total energy of the first energy storage device 150, and the total capacity of the second energy storage device 160 is also greater than the total capacity of the first energy storage device 150. The second energy storage device 160 is a power supply device specially adapted to the outdoor walking equipment, and the first energy storage device 150 is a power supply device that is adapted to both the outdoor walking equipment and other power tools. As a result, the requirement of long working time is met and the adaptability of the outdoor walking equipment 100 is improved.

The second energy storage device 160 is configured to supply power to the walking motor 130, and the first energy storage device 150 is also configured to supply power to the walking motor 130. Besides, the second energy storage device 160 is also configured to supply power to the driving motor 141, and the first energy storage device 150 is also configured to supply power to the drive motor 141. In a power supply mode according to other embodiments, the second energy storage device 160 can supply power to the walking motor 130 and the driving motor 141 at the same time, and the first energy storage device 150 only supplies power to the walking motor 130 but not the driving motor 141. In another power supply mode according to other embodiments, the second energy storage device 160 supplies power to the walking motor 130 and the driving motor 141 at the same time, and the first energy storage device 150 only supplies power to the driving motor 141. In another power supply mode according to other embodiments, the second energy storage device 160 is further configured to supply power to the driving motor 141, and the first energy storage device 150 is not configured to supply power to the driving motor 141.

The total energy of the second energy storage device 160 is greater than the total energy of the first energy storage device 150. Through the structure and energy settings of the second energy storage device 160 and the first energy storage device 150, the advantages of high power source and the detachable power supply can be combined, and the problem of inflexibility caused by the high-energy power supply and the problem of low energy amount of the detachable power supply are solved. In this way, the battery lifetime and flexibility of the power supply of outdoor walking equipment 100 are improved.

Figure 4:
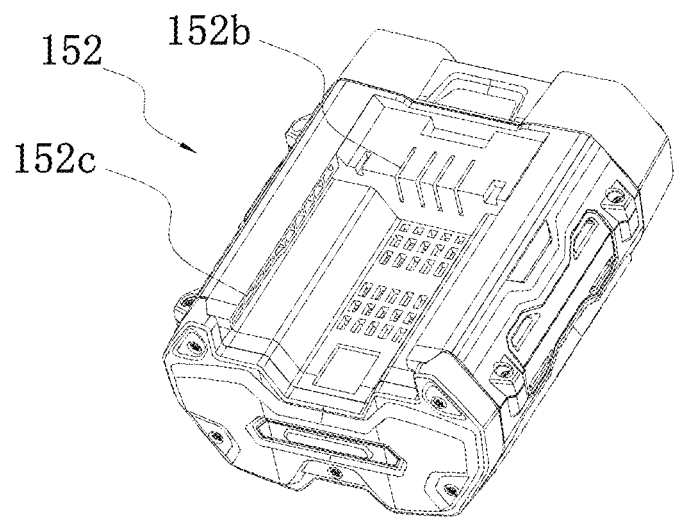
FIG. 4 is a perspective view of a first energy storage device in FIG. 2.
Figure 5:
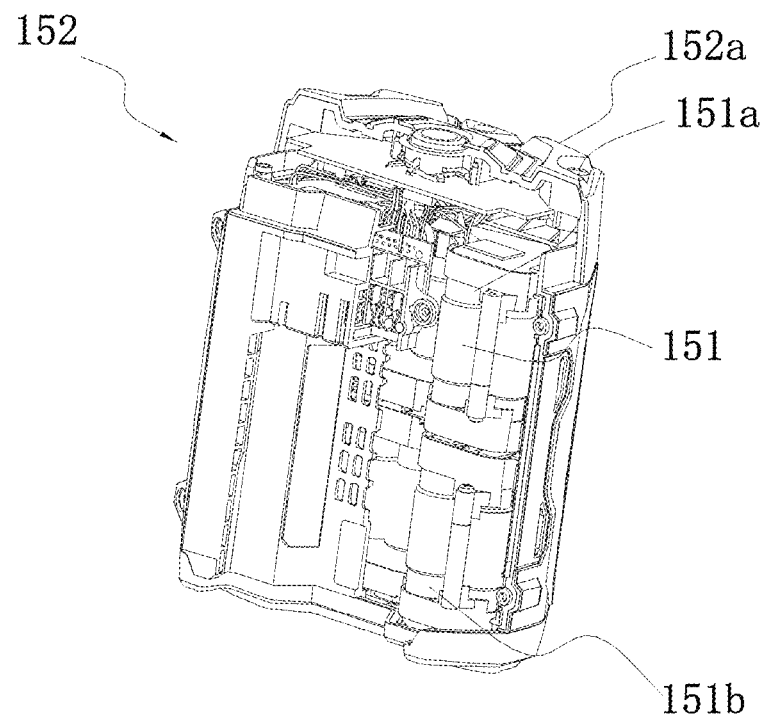
FIG. 5 is an interior view of the first energy storage device in FIG. 4.
Figure 6:
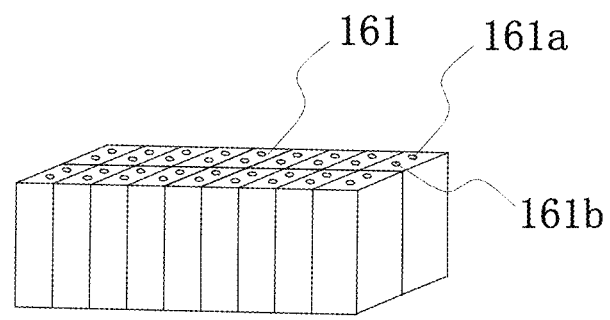
FIG. 6 is a perspective view of a first energy storage unit inside a second energy storage device in FIG. 2.

In this embodiment, as shown in FIGS. 4 and 5, the first energy storage unit 151 in the battery housing 152a is the battery cell unit which is cylindrical. The first energy storage unit 151 includes a first positive electrode 151a and a first negative electrode 151b, and the first positive electrode 151a and the first negative electrode 151b are disposed at opposite ends of the battery cell unit. As shown in FIG. 6, the second energy storage unit 161 which is included in the second energy storage device 160 is the cell unit that is in block-shaped. A plurality of block-shaped cell units are stacked together, thereby reducing the size of the second energy storage device 160 volume. The block-shaped cell unit may specifically be in cubic shape. The second energy storage unit 161 includes a second positive electrode 161a and a second negative electrode 161b, and the second positive electrode 161a and the second negative electrode 161b may be disposed on the same side of the battery cell unit.

Figure 7:
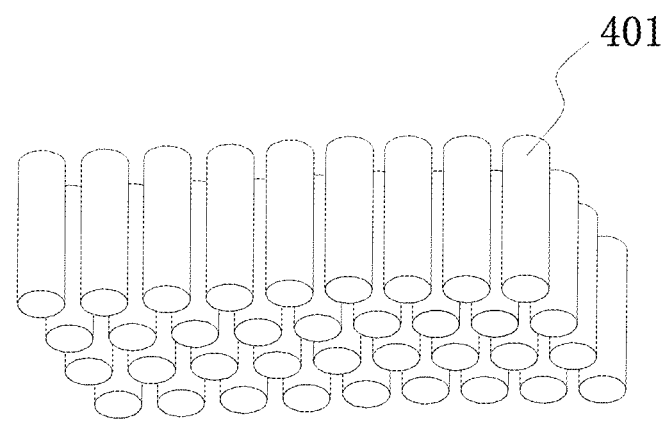
FIG. 7 is a perspective view of another first energy storage unit inside the second energy storage device in FIG. 2.

The second energy storage unit 401 of another embodiment shown in FIG. 7 is also in the shape of a cylinder.

In other embodiments, the second energy storage device may also include multiple energy storage packages arranged separately, and the multiple energy storage packages may be connected in parallel or in series.

An energy density of the first energy storage unit 161 is different from an energy density of the second energy storage unit 161. For the first energy storage device 150 and the second energy storage device 160 with different installation methods, the first energy storage unit 151 and the second energy storage unit 161 with different energy densities can be selected, so that the first energy storage device 150 and the second energy storage device 160 can adapt to the characteristics of fixed connection and detachable installation connection respectively, and achieve the purpose of reducing costs and improving battery life. In this embodiment, the energy density of the first energy storage unit 151 is greater than the energy density of the second energy storage unit 161, so that the cost of the second energy storage device 160 with a larger total energy and a larger volume can be better balanced. Optionally, a ratio of the energy density of the second energy storage unit 161 to the energy density of the first energy storage unit 151 is greater than or equal to 0.3 and less than or equal to 1. Alternatively, the ratio of the energy density of the second energy storage unit 161 to the energy density of the first energy storage unit 151 is greater than or equal to 0.8 and less than or equal to 1. Alternatively, the ratio of the energy density of the second energy storage unit 161 to the energy density of the first energy storage unit 151 is greater than or equal to 0.8 and less than or equal to 1.2. It should be noted that the energy density in this embodiment refers to the energy density by weight.

The first positive electrode 151a of the first energy storage unit 151 is made of a first material, and the second positive electrode 161a of the second energy storage unit 161 is made of a second material. The second material is different from the first material. The outdoor walking equipment 100 can use different types of the first energy storage device 150 and the second energy storage device 160 for power supply. Thereby, the power supply platform of other electric tools on the market can be better taken into account. In addition, the cost of the outdoor walking equipment 100 itself can be reduced so that the total energy of the first energy storage device 150 can be increased. For example, in this embodiment, the second positive electrode 161a of the second energy storage unit 161 is made of lithium iron phosphate, and the first positive electrode 151a of the first energy storage unit 151 is made of a material containing lithium element. The first material and the second material may also be selected from nickel-cadmium, graphene and other materials to achieve different combinations of battery characteristics.

In other embodiments, the second energy storage unit may also be a supercapacitor, also known as an electrochemical capacitor. Specifically, the supercapacitor is an asymmetric supercapacitor. The electrochemical capacitors based on the principle of bipolar capacitor generally adopt a symmetrical design, wherein the positive and negative electrodes are made of an identical material and are of a same weight. For example, the symmetrical capacitors of an activated carbon electrode generally have no positive or negative electrodes. Although the power density and the life cycle of the activated carbon electrodes are excellent, the energy density of the activated carbon electrodes is much lower than that of lithium-ion batteries, nickel-metal hydride batteries, etc. However, an asymmetric capacitor uses different materials for the two electrodes, such as carbon material/transition metal oxide system electrode material, carbon material/conducting polymer system electrode material, or two types of activated carbon electrodes with different electrochemical properties. In this way, the energy density of electrochemical capacitors is improved, and the energy density reaches 80-120 Wh/kg, which makes the asymmetric capacitor an energy supply unit for power tools. Preferably, the second energy storage unit may be a Lithium Carbon Capacitor (LCC).

Figure 11:
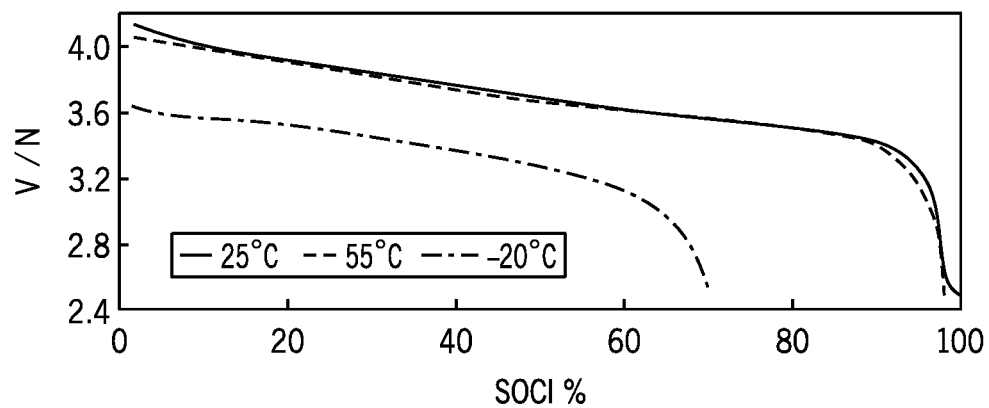
FIG. 11 is a discharging curve diagram of the first energy storage device at different temperatures.
Figure 12:
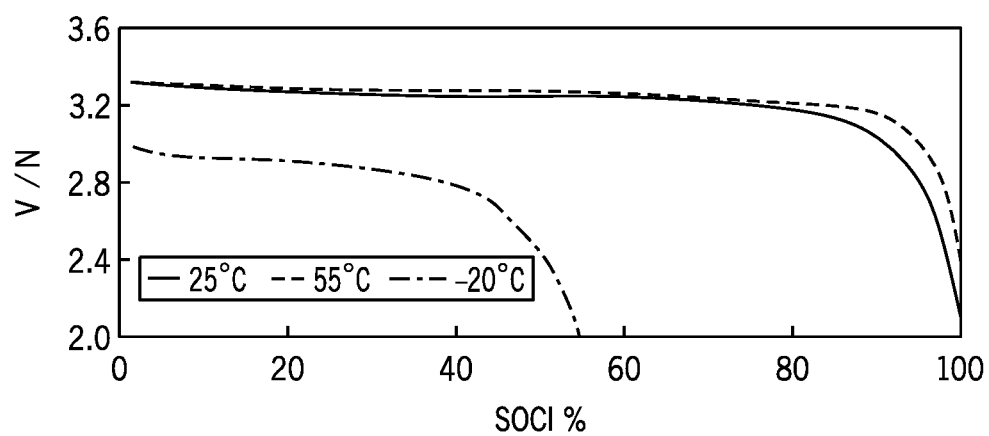
FIG. 12 is a discharging curve diagram of the second energy storage device at different temperatures.

The battery chemistries of the first energy storage unit 151 and the second energy storage unit 161 are different, so that the first energy storage device 150 and the second energy storage device 160 can have different service lives. In this way, even when one of the first energy storage device 150 and the second energy storage device 160 is damaged, the other one can still supply power to the outdoor walking equipment 100. Furthermore, since the first energy storage unit 151 and the second energy storage unit 161 are of different battery chemistries, the temperature characteristics of the first energy storage device 150 and the second energy storage device 160 are also different. In this way, when the outdoor walking equipment 100 works in a low temperature environment, one of the first energy storage device 150 and the second energy storage device 160 which has better characteristics at low temperature can be used for power supply. For example, in this embodiment, the second energy storage unit 161 is a lithium iron phosphate battery cell, and the first energy storage unit 151 is a lithium battery cell. As shown in FIG. 11 and FIG. 12, at −20° C., the second energy storage device 160 can discharge more electricity than the first energy storage device 150. Therefore, when the outdoor walking equipment 100 is in a low temperature working environment, use the second energy storage device 160 for power supply as much as possible, so that the working efficiency of the outdoor walking equipment 100 can be improved.

The outdoor walking equipment 100 further includes an electrical connection assembly for electrically connecting the second energy storage device 160 and the walking motor 130, and a controller 175. The connection assembly and the electrical connection assembly are provided separately. For the first energy storage device 150, when the first energy storage device 150 is pulled out from the housing 110, the first energy storage device 150 can be mechanically disconnected from the housing 110. The first energy storage device 150 can also be disconnected from the housing 110. Basically at the same time, the energy storage device 150 is electrically disconnected from the housing 110. As for the second energy storage device 160, the electrical connection assemblies and the connection assemblies are provided separately. When the second energy storage device 160 is detached from the housing 110 by an auxiliary tool or through multiple operation steps, different operation methods are necessary to separate the electrical connection and mechanical connection of the second energy storage device 160 and the housing 110.

Figure 13:
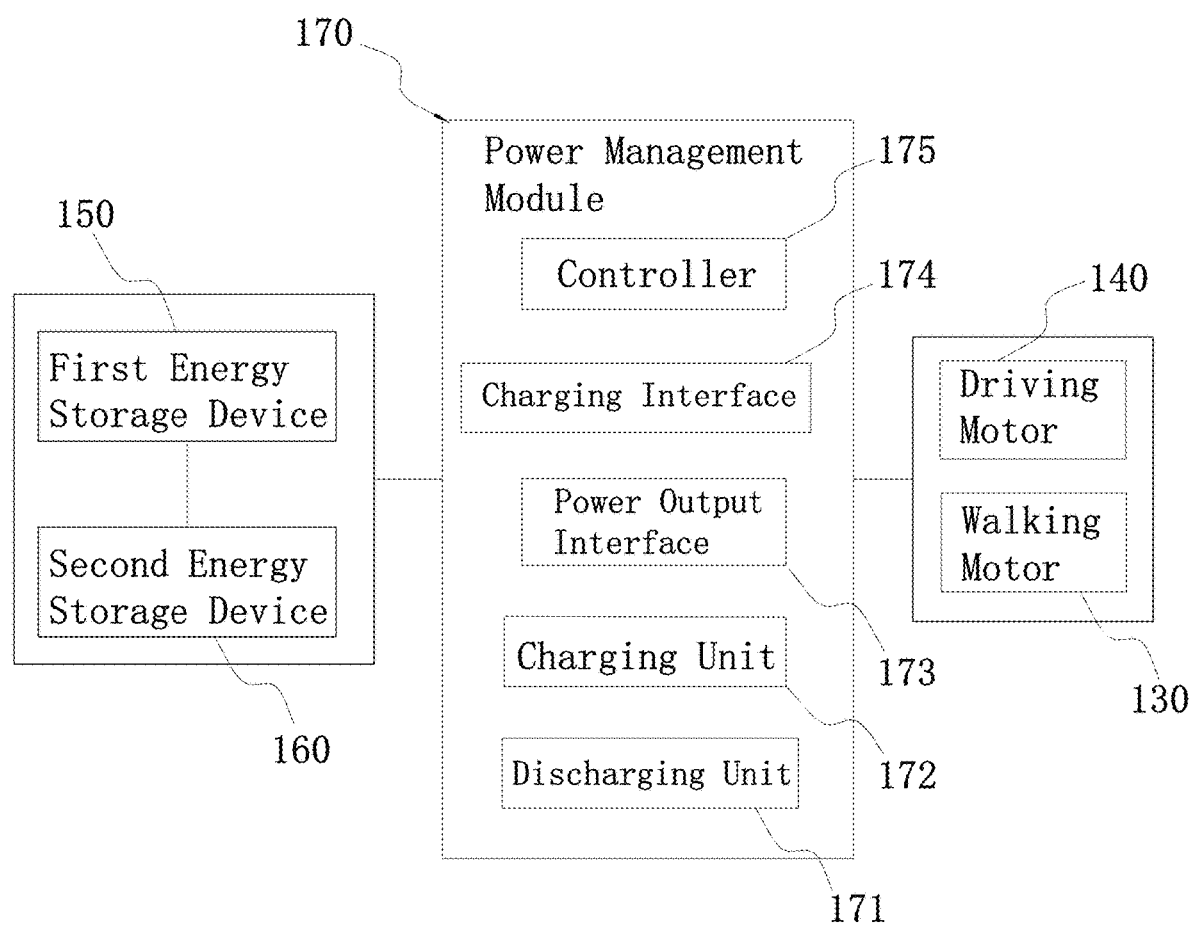
FIG. 13 is a logical block diagram of the outdoor walking equipment in FIG. 1.

As shown in FIG. 1 and FIG. 13, the outdoor walking equipment 100 further includes a power management module 170. The power management module 170 includes a discharging unit 171, a charging unit 172, a power output interface 173, a charging interface 174 and a controller 175. The discharging unit 171 is electrically connected to the first energy storage device 150 and the walking motor 130 so that the first energy storage device 150 supplies power to the walking motor 130. The discharging unit 171 is also electrically connected to the second energy storage device 160 and the walking motor 130 so that the second energy storage device 160 supplies power to the walking motor 130.

The electrical connection assembly includes the discharging unit 171 which is electrically connected to the second energy storage device 160 and the first energy storage device 150. The controller 175 is electrically connected to the discharging unit 171, and the controller 175 is configured to control the discharging mode of the discharging unit 171.

The discharging unit 171 has a first discharging mode and a second discharging mode, and the controller 175 is electrically connected to the discharging unit 171 to control the discharging unit 171 to be in the first discharging mode or the second discharging mode. When the discharging unit 171 is in the first discharging mode, one of the first energy storage device 150 and the second energy storage device 160 supplies power to the outdoor walking equipment 100 and the other one does not supply power to the outdoor walking equipment 100. When the discharging unit is in the second discharging mode, the first energy storage device 150 supplies power to the outdoor walking equipment 100 and the second energy storage device 160 also supplies power to the outdoor walking equipment 100. The controller 150 is configured to control the discharging unit 171 to be in the first discharging mode when the voltages of the second energy storage device 160 and the first energy storage device 150 are different, and to control the discharging unit 171 to be in the second discharging mode when the voltages of the second energy storage device 160 and the first energy storage device 150 are same. In this way, the first energy storage device 150 and the second energy storage device 160 can discharge together, so as to provide sufficient electrical energy for the outdoor walking equipment 100. When the voltages of the first energy storage device 150 and the second energy storage device 160 are different, the discharging unit 171 is in the first discharging mode, and the one among the first energy storage device 150 or the second energy storage device 160 which has higher voltage is discharged first.

Only when the voltages of the first energy storage device 150 and the second energy storage device 160 are equal or substantially equal can they be discharged together. That is, the first energy storage device 150 and the second energy storage device 160 can be discharged together only when a voltage difference between them is within a predefined range. In this embodiment, the equal voltages of the first energy storage device 150 and the second energy storage device 160 means that the voltage difference between the first energy storage device 150 and the second energy storage device 160 is less than a predefined voltage difference threshold. The predefined voltage difference threshold can be 2V or 1V, etc. The first energy storage device 150 and the second energy storage device 160 being discharged together ensures that a current of the discharge circuits of the first energy storage device 150 and the second energy storage device 160 will not exceed a safety current value that the first energy storage device 150 and the second energy storage device 160 can withstand. The advantage is to prevent an output current of the outdoor walking equipment 100 from being too large. The voltages of the first energy storage device 150 and the second energy storage device 160 need to be equal or substantially equal so that the first energy storage device 150 and the second energy storage device 160 can discharge together, that is, the discharging unit 171 is in the second discharging mode. A large voltage difference between the first energy storage device 150 and the second energy storage device 160 may occur when they are connected in parallel. When a high-voltage energy storage device and a low-voltage energy storage device are discharged in parallel, the high-voltage energy storage device may discharge the low-voltage energy storage device, so that a current backflow may occur. The predefined range for the voltage difference between the first energy storage device 150 and the second energy storage device 160 prevents the large voltage difference and the current backflow that are against to the normal discharge of the first energy storage device 150 and the second energy storage device 160 and the normal work of the outdoor walking equipment 100.

In other embodiments, when the discharging unit is in the first discharging mode, the second energy storage device supplies power to the outdoor walking equipment, and the first energy storage device does not supply power to the outdoor walking equipment. When the discharging unit is in the second discharging mode, the first energy storage device supplies power to the outdoor walking equipment and the second energy storage device does not supply power to the outdoor walking equipment. The controller is configured to control the discharging unit to be in the first discharging mode when a remaining power of the second energy storage device is greater than a predefined value, and to control the discharging unit to be in the second discharging mode when the remaining power of the second energy storage device is less than the predefined value. The second energy storage device is preferentially used to supply power to outdoor walking equipment, which ensures the electricity of the first energy storage device is in store. In this way, the first energy storage device can be used to supply power to outdoor walking equipment or power tools.

Specifically, a maximum discharge power of the second energy storage device 160 is greater than or equal to 5 kW and less than or equal to 200 kW, and the maximum discharge power of the first energy storage device 150 is greater than or equal to 1 kW and less than or equal to 10 kW. Alternatively, the maximum discharge power of the second energy storage device 160 is greater than or equal to 50 kW and less than or equal to 150 kW, and the maximum discharge power of the first energy storage device 150 is greater than or equal to 2 kW and less than or equal to 8 kW. This makes a discharge efficiency of the first energy storage device 150 and the second energy storage device 160 higher. It should be noted that the maximum discharge power is the discharge power when the outdoor walking equipment 100 is working normally. However, when the walking motor of the outdoor walking equipment 100 is stalling or cutting stones, the instantaneous discharge power may be abnormally large, which is not referred to as the maximum discharge power described in this embodiment.

The power output interface 173 is used to output power to an external equipment. The power output interface 173 is electrically connected to the second energy storage device 160 or the first energy storage device 150. The direct power supply from the second energy storage device 160 to external equipment can be achieved by an electric connection directly from the second energy storage device 160 to the power output interface 173. Alternatively, the power output interface 173 can be used so that the outdoor walking equipment 100 can directly supply power to the external equipment through its second energy storage device 160 and first energy storage device 150. This is convenient for the user to use.

The charging unit 172 is electrically connected to the first energy storage device 150 and the second energy storage device 160, and the charging unit 172 is also electrically connected to the controller 175 and the charging interface 174. The controller 175 controls the charging unit 172 to be electrically connected to an external power source through the charging interface 174, so that the external power source can supply power to the first energy storage device 150 and the second energy storage device 160 through the charging interface 174.

In this embodiment, the charging unit 172 has a first charging mode and a second charging mode. When the charging unit 172 is in the first charging mode, the charging unit 172 charges one of the first energy storage device 150 and the second energy storage device 160. When the charging unit 172 is in the second charging mode, the charging unit 172 supplies power to the first energy storage device 150 and also supplies power to the second energy storage device 160 at the same time. The controller 175 is configured to control the charging unit 172 to be in the first charging mode when the voltages of the first energy storage device 150 and the second energy storage device 160 are different, and to control the charging unit 172 to be in the second charging mode when the voltages of the first energy storage device 150 and the second energy storage device 160 are substantially the same. In this way, when the voltages of the first energy storage device 150 and the second energy storage device 160 are different, the charging unit 172 is in the first charging mode, and the charging unit 172 firstly charges the one which has lower voltage among the first energy storage device 150 and the second energy storage device 160. When the voltages of the first energy storage device 150 and the second energy storage device 160 are substantially the same, the charging unit 172 switches to the second charging mode, in which the first energy storage device 150 and the second energy storage device 160 can be simultaneously charged. In this way, not only can the first energy storage device 150 and the second energy storage device 160 meet the most basic electricity demand in a faster way, but also the charging efficiency can be improved.

In other embodiments, the controller may also make the charging unit to firstly charge the first energy storage device to a predefined fully charged state, and then to charge the second energy storage device. Alternatively, the controller may also make the charging unit to charge the second energy storage device to the predefined fully charged state, and then to charge the first energy storage device. Alternatively, the charging unit is configured to firstly charge the second energy storage device to a first predefined state, and then charge the first energy storage device to a second predefined state, after which the charging unit continues to charge the first energy storage device. The second predefined state may be a state when the energy storage device is in full power, or may be a state when the energy storage device is in other predefined power values. When the second energy storage device is charged to the first predefined state, the second energy storage device has the ability to supply power to the outdoor walking equipment for a certain period of time. Then the second energy storage device switches to supply power to the first energy storage device to ensure that the first energy storage device can supply power to the power tool. This arrangement enables the outdoor walking equipment to operate and work even when the outdoor walking equipment is charged for a short time or is not fully charged and enables the first energy storage device to supply power to the power tool, which is convenient for the user to use.

Optionally, in order to adapt the performance parameters of the second energy storage device 160 and the first energy storage device 150, the maximum charging current of the charging unit 172 when charging the second energy storage device 160 is greater than or equal to 0.04C and less than or equal to 4C, and the maximum charging current of the charging unit 172 when charging the first energy storage device 150 is greater than or equal to 0.04C and less than or equal to 4C. Therefore, the charging time of the first energy storage device 150 and the second energy storage device 160 can be controlled more effectively. The maximum charging current of the first energy storage device 150 is NC means that the first energy storage device 150 can be fully charged within 1/N hour. Likewise, the maximum charging current of the second energy storage device 160 is MC means that the second energy storage device 160 can be fully charged within 1/M hour. Alternatively, the maximum charging current of the charging unit 172 when charging the second energy storage device 160 is greater than or equal to 0.1C and less than or equal to 4C, and the maximum charging current of the charging unit 172 when charging the first energy storage device 150 is greater than or equal to 0.1C and less than or equal to 4C. Alternatively, the maximum charging current of the charging unit 172 when charging the second energy storage device 160 is greater than or equal to 0.5C and less than or equal to 4C, and the maximum charging current of the charging unit 172 when charging the first energy storage device 150 is greater than or equal to 0.5C and less than or equal to 4C. In this way, the first energy storage device 150 and the second energy storage device 160 can be fully charged in a short time.

In order to accommodate the energy characteristics of the second energy storage device 160 and the first energy storage device 150, and also to achieve the adjustment to the charging time of the second energy storage device 160 and the first energy storage device 150, a ratio of the maximum charging current charged from the charging unit 172 to the second energy storage device 160 to the maximum charging current charged from the charging unit 172 to the first energy storage device 150 is greater than or equal to 0.02 and less than or equal to 10. Alternatively, the ratio of the maximum charging current charged from the charging unit 172 to the second energy storage device 160 to the maximum charging current charged from the charging unit 172 to the first energy storage device 150 is greater than or equal to 0.05 and less than or equal to 1. It should be noted that the ratio of the maximum charging current charged from the charging unit 172 to the second energy storage device 160 to the maximum charging current charged from the charging unit 172 to the first energy storage device 150 refers to the ratio of the maximum charging current MC of the second energy storage device 160 to the maximum charging current NC of the first energy storage device 150, that is, the ratio of M to N.

Referring to FIGS. 1 and 3, the outdoor walking equipment 100 further includes a driving circuit 176. The driving circuit 176 includes the discharging unit 171 and the charging unit 172. Specifically, the driving circuit 176 includes a plurality of driving switches, and the plurality of driving switches constitute a bridge circuit. The first energy storage device 150 may be provided with multiple battery packs, for example, the first energy storage device 150 is provided with two battery packs. In this embodiment, one battery pack may be regarded as the second energy storage device 150, and the other battery pack may be regarded as the third energy storage device 180. The first energy storage device 150, the second energy storage device 160 and the third energy storage device 180 are connected in parallel. In this embodiment, the driving circuit 176 includes driving switches Q1, Q2, Q3, Q4, Q5, and Q6. The driving switches Q1-Q6 may be semiconductor devices, such as metal-oxide semiconductor field effect transistors (MOSFETs) or insulated gate bipolar transistors (IGBTs). There is a parasitic diode in parallel with each driving switch. The driving switch Q4 is a discharging switch of the first energy storage device 150, and the driving switch Q1 is a charging switch of the first energy storage device 150. The driving switch Q5 is a discharging switch of the third energy storage device 180, and the driving switch Q2 is a charging switch of the third energy storage device 180. The driving switch Q3 is a discharging switch of the second energy storage device 160, and the driving switch Q6 is a charging switch of the second energy storage device 160.

During the charging process, the charging sequence of the first energy storage device 150, the second energy storage device 160 and the third energy storage device 180 is controlled by the driving circuit 176. That is, during the charging process, the controller 175 controls the driving switches Q4, Q5, and Q6 to close, and charges the energy storage device which has the lowest voltage through the charging unit 172. At this time, the energy storage device which has a high voltage is prevented from being charged by a diode. The energy storage device is charged until the voltages of the multiple energy storage devices are the same, then the charging unit 172 supplies power to the multiple energy storage devices at the same time to ensure the consistency of voltage. For example, when the voltage of the first energy storage device 150 is the lowest and the voltage of the second energy storage device 160 is the highest, the controller 175 controls Q4, Q5, and Q6 to be turned on. At this time, the diode connected in parallel with the driving switch Q1 of the first energy storage device 150 is turned on, and the diodes connected in parallel with the driving switches Q2 and Q3 are turned off, so that the external power supply connected to the charging interface 174 can only supply power to the first energy storage device 150. At this time, the charging unit 172 is in the first charging mode. When the voltage of the first energy storage device 150 increases to be the same with that of the third energy storage device 180, the diode connected in parallel with the driving switch Q2 is also turned on. At this time, the external power supply connected to the charging interface 174 supplies power to the first energy storage device 150 and the third energy storage device 180. When the voltages of the first energy storage device 150 and the third energy storage device 180 increase to be the same with the voltage of the second energy storage device 160, the diode connected in parallel with the driving switch Q3 is also turned on. At this time, the external power supply connected to the charging interface 174 supplies power to the first energy storage device 150, the second energy storage device 160 and the third energy storage device 180 simultaneously, and the charging unit 172 is in the second charging mode at this time.

During the discharging process, the discharging sequence among the first energy storage device 150, the second energy storage device 160 and the third energy storage device 180 is controlled by the driving circuit 176. That is, during the discharge process, the controller 175 controls the driving switches Q1, Q2, and Q3 to turn on, and the discharging unit 171 makes the energy storage device with the highest voltage to discharge first, at which time the diode is used to prevent the discharge of the energy storage device which has low voltage. The energy storage devices are discharged until the voltages of the plurality of energy storage devices are same, and the discharging unit 171 discharges the plurality of energy storage devices at the same time to ensure the consistency of voltage. For example, when the voltage of the first energy storage device 150 is the lowest and the voltage of the second energy storage device 160 is the highest, the controller 175 controls Q1, Q2, and Q3 to be turned on. At this time, the diode connected in parallel with the driving switch Q6 on the second energy storage device 160 is turned on, and the diodes connected in parallel with the driving switches Q4 and Q5 are turned off, so that the second energy storage device 160 can supply power to the walking motor 130 at this time. At this time, the discharging unit 171 is in the first discharging mode. When the voltage of the second energy storage device 160 is reduced to be same with that of the third energy storage device 180, the diode connected in parallel with the driving switch Q5 is also turned on. At this time, the second energy storage device 160 and the third energy storage device 180 supply power to the walking motor simultaneously. When the voltages of the second energy storage device 160 and the third energy storage device 180 are reduced to be same with the first energy storage device 150, the diode connected in parallel with the driving switch Q4 is also turned on. The first energy storage device 150, the second energy storage device 160 and the third energy storage device 180 supply power to the walking motor 130 at the same time, and the discharge unit 171 is in the second discharging mode at this time.

The second energy storage device 160 is configured to charge the first energy storage device 150. That is, when the second energy storage device 160 and the first energy storage device 150 are installed to the body 100a at the same time, the second energy storage device 160 can charge the first energy storage device 150.

In this embodiment, the total energy of the second energy storage device 160 is greater than the total energy of the first energy storage device 150. When the remaining power of the first energy storage device 150 is insufficient, the first energy storage device can be additionally charged by the second energy storage device 160, so that the platform-based first energy storage device 150 can meet more working demands of the user. In this embodiment, the ratio of the total energy of the second energy storage device 160 to the total energy of the first energy storage device 150 is greater than or equal to 1 and less than or equal to 50. Alternatively, the ratio of the total energy of the second energy storage device 160 to the total energy of the first energy storage device 150 is greater than or equal to 2 and less than or equal to 20. Alternatively, the ratio of the total energy of the second energy storage device 160 to the total energy of the first energy storage device 150 is greater than or equal to 5 and less than or equal to 20. It should be noted that, in this embodiment, the total energy of the first energy storage device 150 can be understood as the total energy of one battery pack 152 included in the first energy storage device 150, and can also be understood as the total energy of all the battery packs 152 included in the first energy storage device 150.

In this embodiment, the total capacity of the second energy storage device 160 is greater than the total capacity of the first energy storage device 150. When the remaining power of the first energy storage device 150 is insufficient, the first energy storage device 160 can be additionally charged by the second energy storage device, so that the platform-based first energy storage device 150 can meet more working demands of the user. In this embodiment, the ratio of the total capacity of the second energy storage device 160 to the total capacity of the first energy storage device 150 is greater than or equal to 1 and less than or equal to 50. Alternatively, the ratio of the total capacity of the second energy storage device 160 to the total capacity of the first energy storage device 150 is greater than or equal to 2 and less than or equal to 20. Alternatively, the ratio of the total capacity of the second energy storage device 160 to the total capacity of the first energy storage device 150 is greater than or equal to 5 and less than or equal to 20. It should be noted that, in this embodiment, the total capacity of the first energy storage device 150 can be understood as the total capacity of one battery pack 152 included in the first energy storage device 150 and can also be understood as the total capacity of all the battery packs 152 included in the first energy storage device 150.

Optionally, the second energy storage device 160 is configured to charge the first energy storage device 150 when the remaining power of the first energy storage device 150 is less than a predefined value. Therefore, when the user uses the outdoor walking equipment 100 for outdoor work, other power tools such as blower 200a and pruner can also be carried. The first energy storage device 150 can be used to supply power to the power tools such as the blower 200a or the pruner, and when the power of the first energy storage device 150 is used up, the second energy storage device 160 can be used to charge the first energy storage device 150 once more. The whole of the second energy storage device 160 and the first energy storage device 150 constitutes a power supply station, which can not only guarantee the serving time for power supply for the outdoor walking equipment 100, but also realize the flexible use of the energy storage device.

Specifically, the charging unit 172 may be connected to the first energy storage device 150 and the second energy storage device 160 respectively, and the electricity stored in the second energy storage device 160 is transferred to the first energy storage device 150 through the charging unit 172.

Figure 3B:
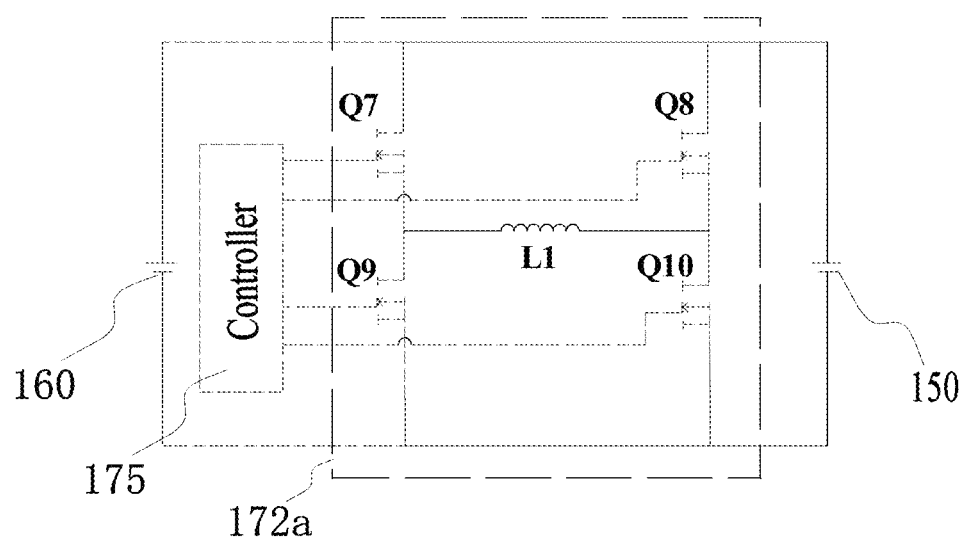
FIG. 3B is a circuit diagram when a second energy storage device charges a first energy storage device.

As shown in FIG. 13 and FIG. 3B, the charging unit 172 further includes: a charging circuit 172a disposed between the first energy storage device 150 and the second energy storage device 160. The charging circuit 172a is electrically connected to the controller 175. The charging circuit 172a enables the second energy storage device 160 to charge the first energy storage device 150. When the voltage of the second energy storage device 160 is higher than the voltage of the first energy storage device 150, the controller 175 can adjust the charging current from the second energy storage device 160 to the first energy storage device 150 by controlling the charging circuit 172a and can also decrease the charging voltage output from the second energy storage device 160 to the first energy storage device 150 by controlling the charging circuit 172a. In this way, the overheating of the charging unit 172 caused by excessive charging current and the danger can be avoided, thereby improving the safety of the second energy storage device 160 charging the first energy storage device 150. When the voltage of the second energy storage device 160 is lower than the voltage of the first energy storage device 150, the controller 175 can control the charging circuit 172a to increase the charging voltage output from the second energy storage device 160 to the first energy storage device 150, thereby a situation in which the first energy storage device 150 cannot be charged because of the backflow of current is avoided. Specifically, the charging circuit 172a includes driving switches Q7, Q8, Q9, and Q10, and the charging circuit 172a further includes an inductor L1. The driving switches Q7, Q8, Q9, Q10 may be semiconductor devices, such as metal-oxide semiconductor field effect transistors (MOSFETs) or insulated gate bipolar transistors (IGBTs). The driving switch Q7 and the driving switch Q9 are connected in series to form a first circuit, the driving switch Q8 and the driving switch Q10 are connected in series to form a second circuit, and the first circuit and the second circuit are connected in parallel. The second energy storage device 160 is connected to an input terminal of the charging circuit 172a, and the first energy storage device 150 is connected to an output terminal of the charging circuit 172a. The second energy storage device 160 supplies power to the first energy storage device 150 through the charging circuit. A first terminal of the inductor L1 is connected between the driving switch Q7 and the driving switch Q9, and a second terminal of the inductor L1 is connected between the driving switch Q8 and the driving switch Q10. The controller 175 is connected to the control terminals of the driving switches Q7, Q8, Q9, and Q10 to control the duty ratios of the driving switches Q7, Q8, Q9, and Q10. The output voltage output from the second energy storage device 160 to the first energy storage device 150 is achieved by controlling the duty ratios of the driving switches Q7, Q8, Q9, and Q10. When the second energy storage device 160 charges the first energy storage device 150, the controller 175 first controls the driving switch Q7 and the driving switch Q10 to close and controls the driving switch Q8 and the driving switch Q9 to open. In this way, the charging current flows through the driving switch Q7, the inductor L1 and the driving switch Q10, so as to store energy for the inductor L1. Then the controller controls the driving switch Q8 and the driving switch Q9 to close and controls the driving switch Q7 and the driving switch Q10 to open. In this way, the charging current flows successively through the driving switch Q9 and the driving switch Q8, thereby charging the first energy storage device 150. By setting the charging circuit 172a, the first energy storage device 150 can be charged by the second energy storage device 160 in a more safe and efficient way, which in turn improves the flexibility and safety of the outdoor walking equipment 100.

When the outdoor walking equipment 100 is in a no-load working state, a ratio of the maximum battery lifetime of the second energy storage device 160 to the maximum battery lifetime of the first energy storage device 150 is greater than or equal to 1 and less than or equal to 50. Alternatively, when the outdoor walking equipment 100 is in a no-load working state, a ratio of the maximum battery lifetime of the second energy storage device 160 to the maximum battery lifetime of the first energy storage device 150 is greater than or equal to 2 and less than or equal to 20. Alternatively, when the outdoor walking equipment 100 is in a no-load working state, a ratio of the maximum battery lifetime of the second energy storage device 160 to the maximum battery lifetime of the first energy storage device 150 is greater than or equal to 3 and less than or equal to 10. In this way, while satisfying the long battery life of the outdoor walking device 100, the compact size of the outdoor walking device 100 can also be considered.

The outdoor walking equipment 100 further includes a first identification terminal and a second identification terminal. The first identification terminal is engageable with the second energy storage device 160, and the second identification terminal is engageable with the first energy storage device 150. The outdoor walking equipment identifies a type of the second energy storage device 160 and the first energy storage device 150 through the first identification terminal and the second identification terminal and selectively connects them to the driving circuit and the charging circuit. In an embodiment, the first identification terminal and the second identification terminal are different. In an embodiment, the first identification terminal and the second identification terminal are the same.

The outdoor walking equipment 100 may include multiple installation positions for installing the first energy storage device 150, so that the outdoor walking equipment 100 may be installed with multiple first energy storage devices 150, and the user may install one or more first energy storage devices 150 as needed. In the present embodiment, the outdoor walking equipment 100 is a riding lawn mower, and the seat 111 of the riding lawn mower is generally arranged in the middle of the body 100*a*. The first energy storage device 150 and the second energy storage device 160 are preferably disposed on a rear side of the seat 11. The first energy storage device 150 is arranged on the upper side of the second energy storage device 160. That is, the second energy storage device 160 is fixedly connected to the outdoor walking equipment 100, and the first energy storage device 150 can be detachably installed on a front side of the second energy storage device 160. By stacking the second energy storage device 160 and the first energy storage device 150 on top of each other, the size of the outdoor walking equipment 100 can be shortened, so that the structure of the outdoor walking equipment 100 is more compact, and the overall mobility of the outdoor walking equipment 100 is better. Moreover, the detachably installing of the first energy storage device 150 on the upper side of the second energy storage device 160 also facilitates the user to disassemble and install the first energy storage device 150. The insertion and removal direction of the first energy storage device 150 is inclined relative to the up-down direction, which facilitates the user to install the first energy storage device 150. In the front-rear direction, the distance between the second energy storage device 160 and a wheel shaft of a rear walking wheel 131 is greater than or equal to 0 and less than or equal to 100 cm, so that a center of gravity of the riding lawn mower is set to be more reasonable. Alternatively, in other embodiments, the distance between the second energy storage device 160 and the wheel shaft of the rear walking wheel 131 is greater than or equal to 0 and less than or equal to 50 cm. Alternatively, in other embodiments, in the front-rear direction, the distance between the second energy storage device 160 and the wheel shaft of the rear walking wheel 131 is greater than or equal to 0 and less than or equal to 20 cm. The distance between the second energy storage device 160 and the wheel shaft of the rear walking wheel 131 being zero means that the projection of the second energy storage device 160 overlaps with the projection of the rear walking wheel 131. The distance in this embodiment all refers to the size of the gap between two devices in a certain direction.

In other embodiments, the first energy storage device may also be disposed on a front side of the second energy storage device.

In other embodiments, the first energy storage device may also be disposed on a rear side of the second energy storage device.

The second energy storage device 160 is disposed near the rear walking wheel 131, so that in the up-down direction, the projection of the second energy storage device 160 and the projection of the rear walking wheel 131 at least partially overlap. In the front-rear direction, the distance between the second energy storage device 160 and the wheel shaft of the rear walking wheel 131 is greater than or equal to 0 and less than or equal to 100 cm. In the up-down direction, the projection of the first energy storage device 150 and the projection of the rear walking wheel 131 at least partially overlap, which make it convenient for the user to install the battery pack from the rear of the outdoor walking device. In the left-right direction, the second energy storage device 160 and the first energy storage device 150 are substantially disposed on a central axis of the outdoor walking equipment 100.

In the up-down direction, the distance between the second energy storage device 160 and the wheel shaft of the rear walking wheel 131 is greater than or equal to 0 and less than or equal to 50 cm, so that the center of gravity of the outdoor walking equipment 100 can be effectively lowered.

Figure 10:
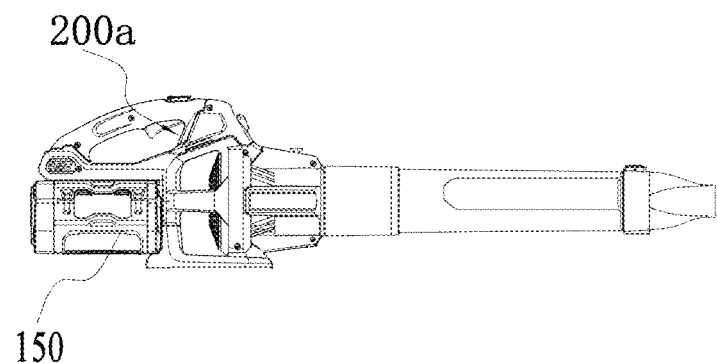
FIG. 10 is a plan view of a blower and the first energy storage device of FIG. 8.

A tool system 10 as shown in FIG. 8 which includes: an adapter 310, the outdoor walking equipment 100 and the power tool. The power tool can be the blower 200*a*, the lawn mower 200*b*, or the chainsaw 200*c*. Here, the second energy storage device 160 in the outdoor walking equipment 100 is used to supply power to the outdoor walking equipment. In addition to supplying power to the outdoor walking equipment 100, the first energy storage device 150 can also be detached from the housing 110 to power the power tool. As shown in FIG. 10, the battery pack 152 in the first energy storage device 150 can be detached to supply power to the blower 200*a*. Blower 200*a* is provided with a tool interface 201 that mates with a battery pack interface 152*b*. The structure of the tool interface 201 may be same as that of the body interface in the outdoor walking equipment 100, which further improves the adaptability of the battery pack 152.

Figure 9:
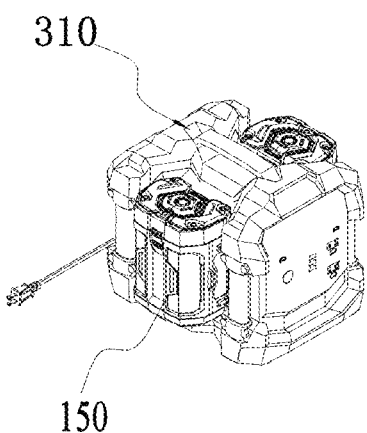
FIG. 9 is a perspective view of an adapter and a first energy storage device in FIG. 8.

In this embodiment, the tool system 10 further includes a charging device 320 for charging the outdoor walking equipment. The charging device 320 may also be considered as part of the outdoor walking equipment 100. The charging device 320 is engageable with the charging interface 174 in FIG. 2 and can be electrically connected with the external power supply. So that the charging device 320 can electrically connect the external power supply with the charging interface 174, and then supply power to the first energy storage device 150 and the second energy storage device 160. In addition to being taken out to charge other power tools, the first energy storage device 150 can also be charged by charging devices or charging platforms of other power tool. In other words, the first energy storage device 150 can not only be charged in the outdoor walking equipment 100, but also be taken out to be charged separately by other charging equipment. In this way, the second energy storage device 160 and the first energy storage device 150 can be simultaneously charged by different charging platforms, so that the purpose of fast charging can be achieved. For example, in this embodiment, the tool system 10 further includes the adapter 310. When the first energy storage device 150 is detached from the outdoor walking equipment 100, the first energy storage device 150 can be powered by the adapter. In this way, for the user working outdoors, when there is no charging device 320 nearby, the first energy storage device 150 can be powered through the adapter 310. In this way, when the remaining power of both the first energy storage device 150 and the second energy storage device 160 of the outdoor walking equipment 100 are insufficient, the first energy storage device 150 can be charged through the adapter 310 in time, which enables the outdoor walking equipment to be charged. The adapter 310 is also configured to be a platform-based and widely applicable charger. In this way, the tool system 10 can better adapt to their work requirements not only for home DIY users, but also for commercial professional users, thereby the practical ability of the tool system is improved. In this way, the flexibility of the first energy storage device 150 in the outdoor walking equipment 100 is further improved. In this embodiment, the adapter 310 is provided with an adapter interface 311 engageable with the first energy storage device 150. As shown in FIG. 9, the first energy storage device 150 can be detachably installed to the adapter 310, and at this time, the adapter 310 can continuously charge the first energy storage device 150.

In this embodiment, a nominal voltage of the battery pack 152 included in the first energy storage device 150 is 56V. It can be understood that the nominal voltage of the first energy storage device 150 may be greater than or equal to 20V and less than or equal to 100V, or the nominal voltage of the first energy storage device 150 may be greater than or equal to 36V and less than or equal to 80V, or the nominal voltage of the first energy storage device 150 may be greater than or equal to 40V and less than or equal to 60V. Or the nominal voltage of the first energy storage device 150 may be greater than or equal to 100V and less than or equal to 800V It can be understood that the nominal voltage of the first energy storage device 150 may be 20V, 24V, 36V, 40V, 48V, 56V, 60V, 80V, 100V, 400V, 800V In this way, the voltage of the first energy storage device 150 can cater the voltage platform of the second energy storage device 160, so that the total energy of the second energy storage device 160 can be increased.

The nominal voltage of the second energy storage device 160 is equal to the nominal voltage of the first energy storage device 150. It can be understood that the nominal voltage of the second energy storage device 160 may also be different from the nominal voltage of the first energy storage device 150. The nominal voltage of the second energy storage device 160 may be greater than or equal to 20V and less than or equal to 100V, or the nominal voltage of the second energy storage device 160 may be greater than or equal to 36 V and less than or equal to 80V, or the nominal voltage of the second energy storage device 160 can be greater than or equal to 40V and less than or equal to 60V. Or the nominal voltage of the first energy storage device 150 may be greater than or equal to 100V and less than or equal to 800V. It can be understood that the nominal voltage of the second energy storage device 160 may be 20V, 24V, 36V, 40V, 48V, 56V, 60V, 80V, 100V, 400V, and 800V. In this way, the voltage of the second energy storage device 160 can cater the voltage platform of the first energy storage device 150, so that more power tools can be adapted to.

In this embodiment, a total capacity of the first capacity storage device 150 is greater than or equal to 4 Ah and less than or equal to 80 Ah. Or the total capacity of the first capacity storage device 150 is greater than or equal to 10 Ah and less than or equal to 40 Ah. Or the total capacity of the first capacity storage device 150 is greater than or equal to 20 Ah and less than or equal to 60 Ah. In this way, the first capacity storage device 150 can not only meet the requirements of the battery life of other power tools but can also meet the requirements of the first capacity storage device 150 of the smaller size when adapted to other power tools. The total capacity of the second capacity storage device 160 is greater than or equal to 10 Ah and less than or equal to 500 Ah. Or the total capacity of the second capacity storage device 160 is greater than or equal to 20 Ah and less than or equal to 500 Ah. Or the total capacity of the second capacity storage device 160 is greater than or equal to 40 Ah and less than or equal to 400 Ah. Or the total capacity of the second capacity storage device 160 is greater than or equal to 60 Ah and less than or equal to 600 Ah. In this way, the second capacity storage device 160 can not only consider the requirement of making the outdoor walking device 100 to work for more than half a day, but also consider the size of the outdoor walking device 100 itself.

Alternatively, the total capacity of the first capacity storage device 150 is greater than or equal to 4 Ah and less than or equal to 10 Ah. Or the total capacity of the first capacity storage device 150 is greater than or equal to 10 Ah and less than or equal to 20 Ah. Or the total capacity of the first capacity storage device 150 is greater than or equal to 20 Ah and less than or equal to 30 Ah. Or the total capacity of the first capacity storage device 150 is greater than or equal to 30 Ah and less than or equal to 40 Ah. Or the total capacity of the first capacity storage device 150 is greater than or equal to 50 Ah and less than or equal to 60 Ah. Or the total capacity of the first capacity storage device 150 is greater than or equal to 60 Ah and less than or equal to 80 Ah. The total capacity of the second capacity storage device 160 is greater than or equal to 10 Ah and less than or equal to 20 Ah. Or the total capacity of the second capacity storage device 160 is greater than or equal to 20 Ah and less than or equal to 40 Ah. Or the total capacity of the second capacity storage device 160 is greater than or equal to 40 Ah and less than or equal to 60 Ah. Or the total capacity of the second capacity storage device 160 is greater than or equal to 60 Ah and less than or equal to 80 Ah. Or the total capacity of the second capacity storage device 160 is greater than or equal to 80 Ah and less than or equal to 100 Ah. Or the total capacity of the second capacity storage device 160 is greater than or equal to 100 Ah and less than or equal to 200 Ah. Or the total capacity of the second capacity storage device 160 is greater than or equal to 600 Ah and less than or equal to 600 Ah. Or the total capacity of the second capacity storage device 160 is greater than or equal to 600 Ah and less than or equal to 400 Ah.

The total energy of the first energy storage device 150 is greater than or equal to 100 Wh and less than or equal to 4000 Wh. The total energy of the first energy storage device 150 is greater than or equal to 100 Wh and less than or equal to 1500 Wh. The total energy of the second energy storage device 160 is greater than or equal to 1 kWh and less than or equal to 30 kWh. Or, in other embodiments, the total energy of the first energy storage device 150 is greater than or equal to 300 Wh and less than or equal to 1000 Wh. The total energy of the second energy storage device 160 is greater than or equal to 2 kWh and less than or equal to 20 kWh. Or, in other embodiments, the total energy of the first energy storage device 150 is greater than or equal to 300 Wh and less than or equal to 8000 Wh. The total energy of the second energy storage device 160 is greater than or equal to 5 kWh and less than or equal to 20 kWh. In this way, the total energy of the first energy storage device 150 and the second energy storage device 160 are made to be more reasonable. The total energy of the first energy storage device 150 and the second energy storage device 160 can not only enable the outdoor walking equipment 100 to work outdoors for more than 1 hour, and at the same time can reduce the size of the outdoor walking equipment 100 as much as possible. In addition, the total energy of the first energy storage device 150 and the second energy storage device 160 can meet the needs of professional users to work outdoors for a whole day, and can also meet the needs of DIY users to work for a long time with an equipment of compact size.

As a specific example, the total energy of the first energy storage device 150 is 4000 Wh. The total energy of the second energy storage device 160 is 20 kWh. In this way, when the first energy storage device 150 and the second energy storage device 160 of the outdoor walking equipment 100 are both fully charged, the outdoor walking equipment 100 can use the second energy storage device to mow grass for 4 to 6 hours, and other power tools that can be installed with the first energy storage device 150 can work for 4 to 5 hours. For example, the first energy storage device 150 can keep the blower 200a blows leaves or weeds for 1 hour, keep the string trimmer 200b trims grass for 1 hour, keep the pruner trims shrubs for 1 hour, and keep the chainsaw 200c trim branches for 1 hour. In this way, a professional garden maintenance person can use the first energy storage device 150 and the second energy storage device 160 of the outdoor walking equipment 100 to work for a whole day, and complete various tasks required for garden maintenance.

In this embodiment, in the left-right direction, the distance between the second energy storage device 150 and the first energy storage device 160 is greater than or equal to 0 and less than or equal to 50 cm.

Figure 14:
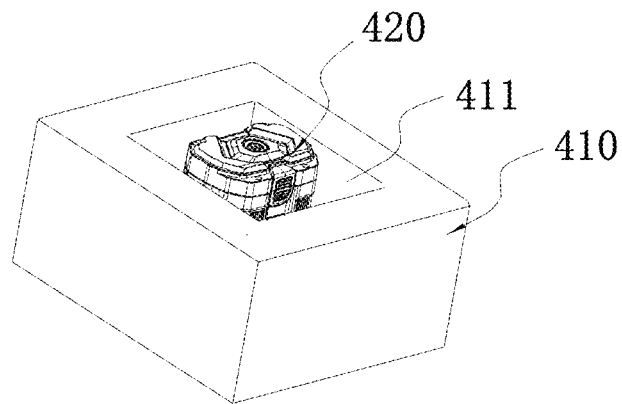
FIG. 14 is a perspective view of a first energy storage device and a second energy storage device according to another embodiment.

As shown in FIG. 14, a groove 411 is formed around the second energy storage device 410. The first energy storage device 420 is at least partially disposed in the groove 411. The second energy storage device 410 is utilized to form an installation structure by itself, in which the first energy storage device 420 can be installed. This makes the overall structure to be compact and the cost is reduced at the same time.

Figure 15:
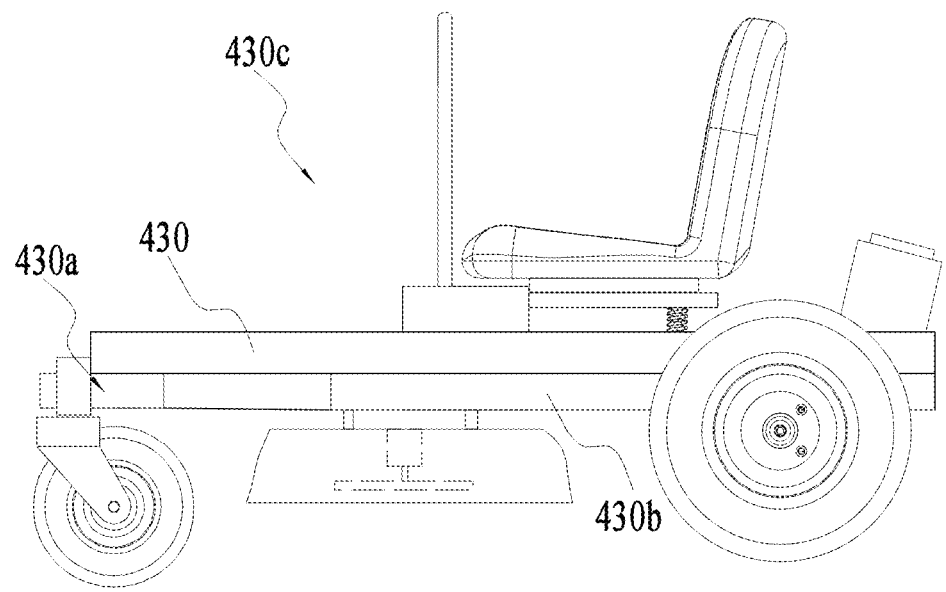
FIG. 15 is a plan view of a riding lawn mower according to another embodiment.

Optionally, according to FIG. 15, the second energy storage device 430 is configured to be in plate shape. The shape of the second energy storage device 430 can be arranged along the extension direction of a body 430a. The second energy storage device 430 can be placed in a housing 430b, and constitutes a frame or bottom plate of an outdoor walking equipment 430c together with the housing 430b. So the volume of the outdoor walking equipment 430c is reduced, and the structure of the outdoor walking equipment 430c is more compact.

Figure 16:
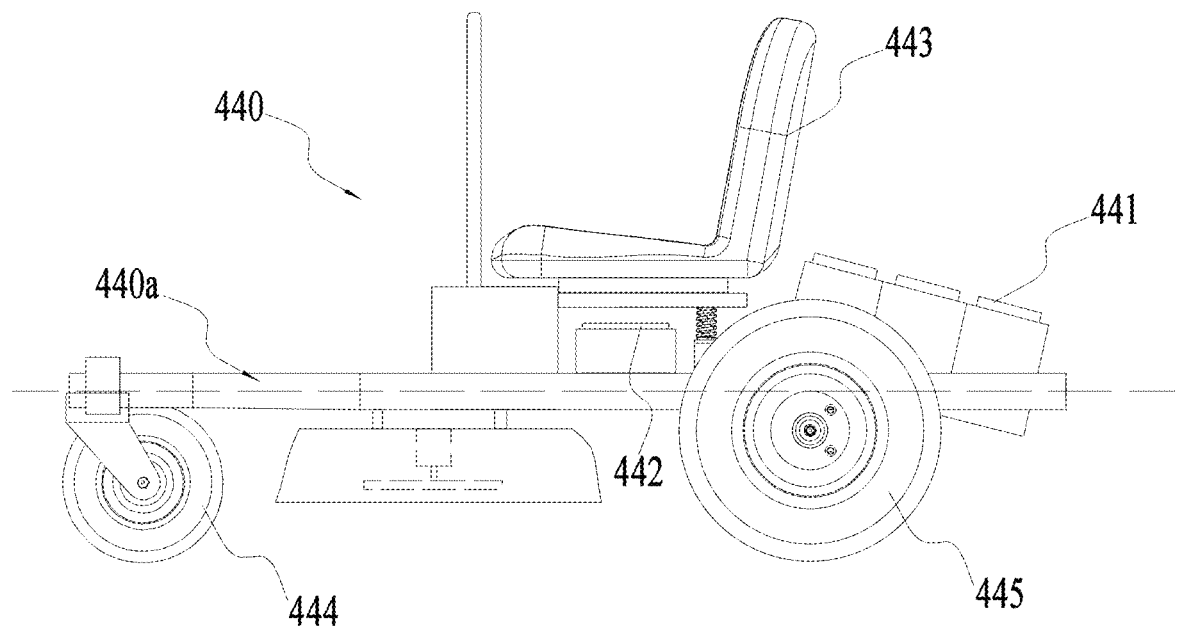
FIG. 16 is a plan view of a riding lawn mower according to another embodiment.

As shown in FIG. 16, the outdoor walking equipment is a riding lawn mower 440. A first energy storage device 441 and a second energy storage device 442 are provided separately. The first energy storage device 441 includes a first battery pack, and the second energy storage device 442 is fixedly arranged on a lower side of a seat 443. In this way, the center of gravity G of the whole machine can be as close to the seat 443 and the front walking wheel 444 as possible in the front-rear direction. Therefore, the problem of a front end of the riding lawn mower 440 being lifted when the riding lawn mower 440 is climbing a slope can be effectively avoided. The positive pressure on the ground from the front walking wheel 444 can be increased, thereby a grip force of the front walking wheel 444 is increased and the slipping when the riding lawn mower 440 is walking on the ground is prevented. Furthermore, especially when a rear end of the riding lawn mower 440 is provided with a grass collecting device, the structure of the second energy storage device 442 which is on the lower side of the seat 443 can effectively lower the center of gravity G of the riding lawn mower 440. Thereby, the stability of the whole machine is improved. Furthermore, the second energy storage device 442 is also disposed on a front side of the rear walking wheel 445.

In addition, in this embodiment, the second energy storage device 442 can be fixedly installed on a frame 440a of the body. That is to say, the second energy storage device 442 cannot be quickly disassembled by the user without using auxiliary tools. In this way, the riding lawn mower 440 can be continuously supplied with power by the second energy storage device 442. Thereby, the problem of inability to walk for the riding lawn mower 440 caused by the unpowered of the riding lawn mower 440 when the first energy storage device 441 and the second energy storage device 442 are both disassembled by the user is avoided.

The position of the second energy storage device 442 is not limited to being arranged on the lower side of the seat 443. In fact, those schemes which distinguish the position of the second energy storage device 442 from the position of the first energy storage device 441 in consider of the balance performance or structural adaptation of the whole machine all belong to the scope of protection of the present disclosure.

In this embodiment, in the front-rear direction, the distance between the second energy storage device 442 and the first energy storage device 441 is greater than or equal to 0 and less than or equal to 200 cm. Or, in other embodiments, in the front-rear direction, the distance between the second energy storage device 442 and the first energy storage device 441 is greater than or equal to 0 and less than or equal to 50 cm. Or, in other embodiments, in the front-rear direction, the distance between the second energy storage device 442 and the first energy storage device 441 is greater than or equal to 0 and less than or equal to 30 cm. The second energy storage device 442 and the first energy storage device 441 are arranged in the front and rear, which can lower the center of gravity of the outdoor walking equipment, and make walking of the outdoor walking equipment more stable. It should be noted that the distance between the second energy storage device 442 and the first energy storage device 441 refers to the distance for the gap between the second energy storage device 442 and the first energy storage device 441 in the front-rear direction.

Figure 17:
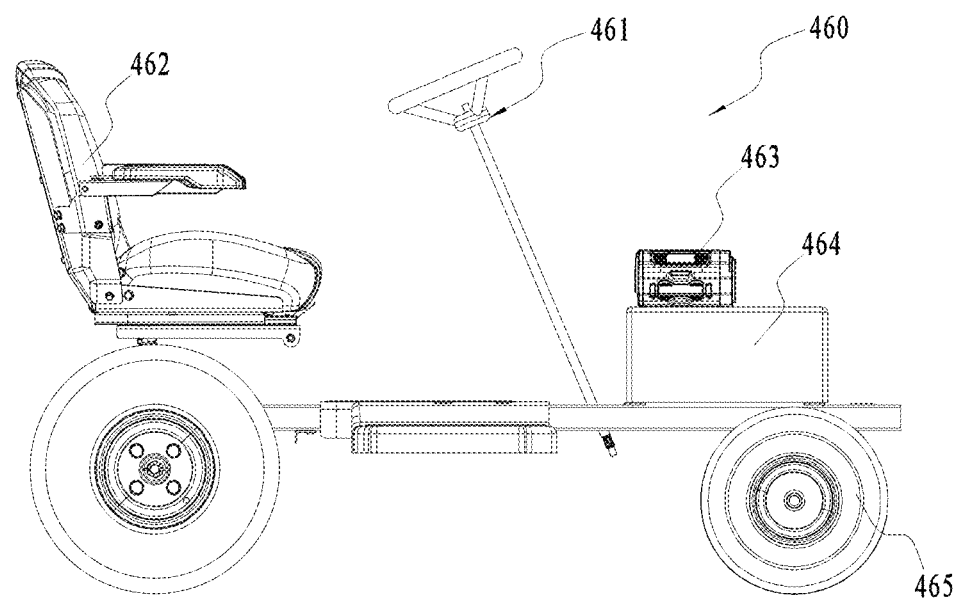
FIG. 17 is a plan view of a riding lawn mower according to another embodiment.

The outdoor walking equipment 460 shown in FIG. 17 is also a riding lawn mower, and the difference between the outdoor walking equipment 460 and other outdoor walking equipment 100 mainly lies in the structure of the operating assembly 461, the position of a seat 462, and the position of a first energy storage device 463 and the position of a second energy storage device 464.

In this embodiment, the seat 462 is disposed on the rear side of the main unit, and the operating assembly 461 includes a steering wheel for user to operate. Both the first energy storage device 463 and the second energy storage device 464 are provided on the front side of the seat 462. The first energy storage device 463 is provided on the upper side of the second energy storage device 464. In the front-rear direction, the distance between the second energy storage device 464 and the front walking wheel 465 is greater than or equal to 0 and less than or equal to 200 cm. Optionally, the first energy storage device 463 is disposed near a front walking wheel 465, so that in the up-down direction, the projection of the first energy storage device 463 and the projection of the front walking wheel 465 at least partially overlap. Or, in other embodiments, in the front-rear direction, the distance between the second energy storage device 464 and the front walking wheel 465 is greater than or equal to 0 and less than or equal to 100 cm. Or, in other embodiments, in the front-rear direction, the distance between the second energy storage device 464 and the front walking wheel 465 is greater than or equal to 0 and less than or equal to 50 cm. Or, in other embodiments, in the front-rear direction, the distance between the second energy storage device 464 and the front walking wheel 465 is greater than or equal to 0 and less than or equal to 20 cm.

Figure 18:
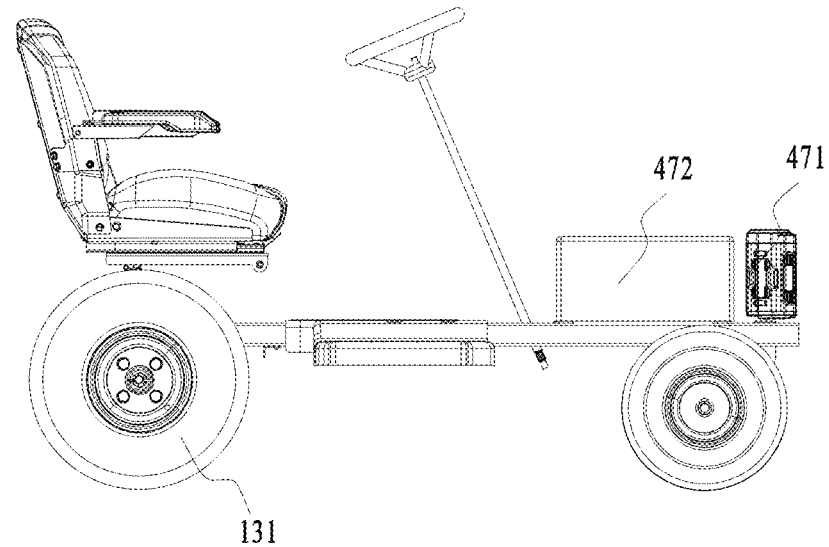
FIG. 18 is a plan view of a riding lawn mower according to another embodiment.

Alternatively, in the embodiment shown in FIG. 18, a first energy storage device 471 may also be disposed on the front side of a second energy storage device 472, so as to facilitate the user to disassemble the first energy storage device 471.

The outdoor walking equipment shown in FIG. 19 may also be a snow blower 480. A function assembly of the snow blower 480 is a snow blowing paddle, which can be driven by a driving motor to rotate to perform snow blowing operations. The snow plow 480 can be a hand-push snow plow. The snow plow 480 includes a walking wheel 482 and a handle 483. The user pushes the handle 483 to drive the walking wheel 482 to rotate so that the snow plow 480 walks. The hand-push snow plow 480 only includes a driving motor for driving the snow-plow paddle, and does not have a walking motor for driving the walking wheels. Since the temperature of the working environment of the snow plow 480 is relatively low, optionally, the outdoor walking equipment further includes a heating device and/or an insulating device for insulating heat for the first energy storage device 484 and/or the second energy storage device 484 included in the snow plow 480, preventing the first energy storage device 484 or the second energy storage device 485 using a specific battery chemistry from working abnormally due to low temperature.

Optionally, both a first energy storage device 484 and a second energy storage device 485 are disposed between two walking wheels 482 of the snow plow 480 and on a lower side of the handle 483. The first energy storage device 484 may be disposed on an upper side of the second energy storage device 485 to facilitate the user to plug and unplug the first energy storage device 484. By making full use of the space between the handle 483 and the walking wheel 482, the whole snow plow 480 becomes compact, and the center of gravity of the snow plow 480 becomes reasonable, which is convenient for the user to control the snow plow 480 to walk.

Figure 20:
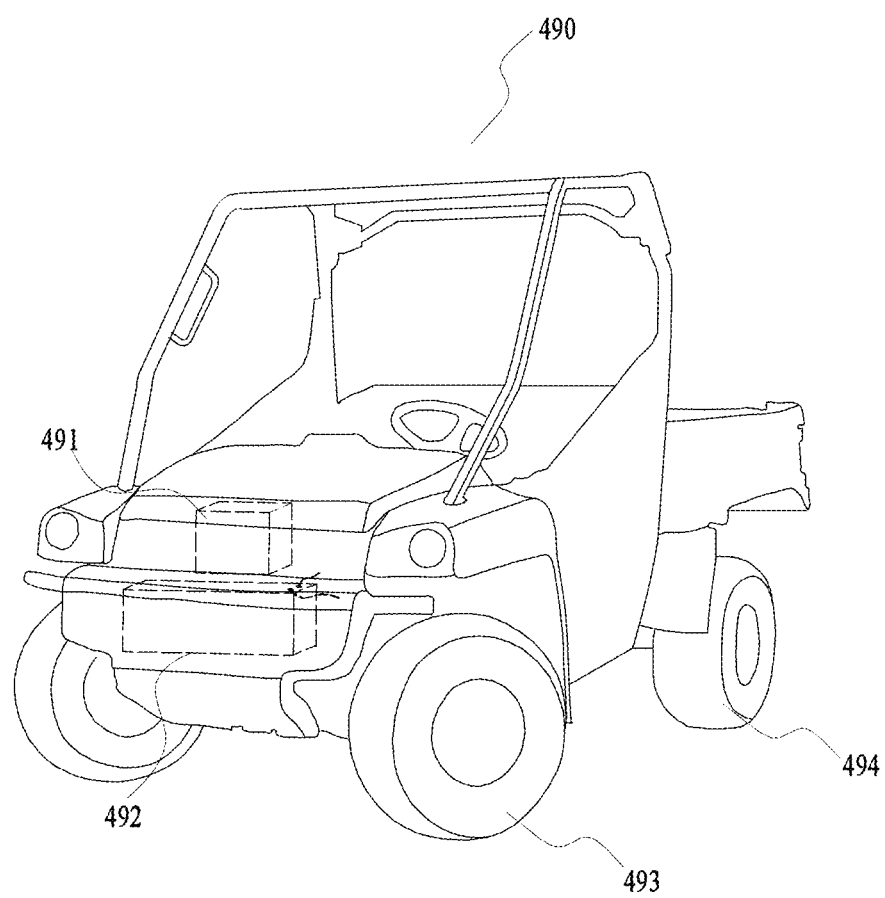
FIG. 20 is a perspective view of an all-terrain vehicle according to another embodiment.
Figure 21:
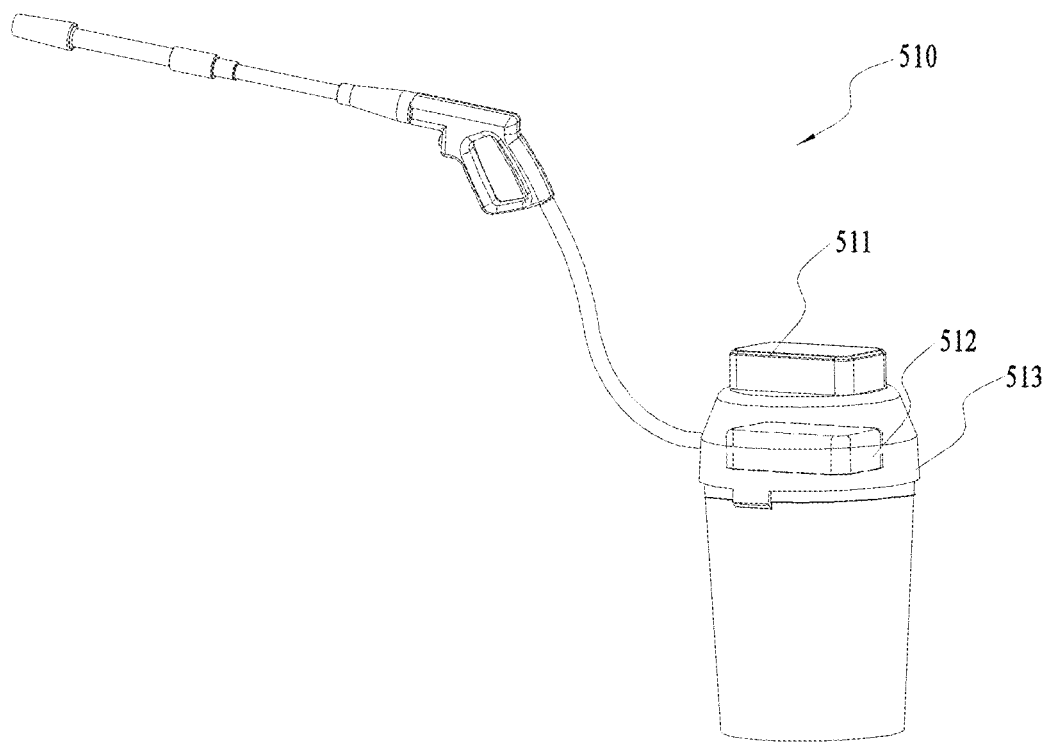
FIG. 21 is a perspective view of an outdoor tool device according to another embodiment.

The outdoor walking equipment shown in FIG. 20 may also be an all-terrain vehicle 490, and a first energy storage device 491 and a second energy storage device 492 may be arranged at the front end of the vehicle body, which is also inside a vehicle cover. The first energy storage device 491 and the second energy storage device 492 are arranged near the front walking wheel 493, and the first energy storage device 491 is arranged on the upper side of the second energy storage device 492. Optionally, the first energy storage device 491 and the second energy storage device 492 may also be disposed near rear walking wheels 494.

As shown in FIG. 21, the outdoor tool equipment can also be a cleaning machine 510, and the cleaning machine 510 can also include a first energy storage device 511 and a second energy storage device 512. The first energy storage device 511 is detachably mounted to a housing 513, and the second energy storage device 512 is fixedly mounted to the housing 513.

The foregoing has shown and described the basic principles, main features and advantages of the present disclosure. Those skilled in the art should understand that the above-mentioned embodiments do not limit the present disclosure in any form, and all technical solutions obtained by means of equivalent replacement or equivalent transformation fall within the protection scope of the present disclosure.

What is claimed is:

1. A riding lawn mower, comprising:
   a frame;
   a seat mounted to the frame;
   a wheel assembly comprising at least one wheel supporting the frame;
   a motor configured to drive the at least one wheel to rotate;
   a cutting assembly comprising at least one cutting piece for cutting grass;
   a driving motor configured to drive the cutting assembly;
   a first energy storage device configured to supply power to at least one of the motor or the driving motor, the first energy storage device comprising at least one first energy storage unit, the first energy storage device detachably mounted to the frame and enabled to supply power to another power tool when detached from the riding lawn mower;
   a second energy storage device configured to supply power to at least one of the walking motor or the driving motor, the second energy storage device comprising at least one second energy storage unit;
   a driving circuit electrically connectable with the first energy storage device and the second energy storage device to transfer power from at least one of the first energy storage device or the second energy storage device to at least one of the motor or the driving motor; and
   a charging circuit electrically connectable with the first energy storage device and the second energy storage device to charge at least one of the first energy storage device or the second energy storage device;
   wherein the riding lawn mower further comprises a first identification terminal engageable with the second energy storage device and a second identification terminal engageable with the first energy storage device and the riding lawn mower identifies a type of the first energy storage device and the second energy storage device through the first identification terminal and the second identification terminal and selectively connects the first energy storage device and the second energy storage device to the driving circuit and the charging circuit.

2. The riding lawn mower of claim 1, wherein each of the at least one first energy storage unit and each of the at least one second energy storage unit have different battery chemistries.

3. The riding lawn mower of claim 1, wherein each of the at least one first energy storage unit has a first positive electrode, each of the at least one second energy storage unit has a second positive electrode, and the first positive electrode and the second positive electrode are made from different materials.

4. The riding lawn mower of claim 1, wherein the first identification terminal and the second identification terminal are not identical.

5. The riding lawn mower of claim 1, wherein a nominal voltage of the second energy storage device is equal to a nominal voltage of the first energy storage device.

6. The riding lawn mower of claim 1, further comprising a controller electrically connected with the charging circuit, the controller configured to control the charging circuit to charge the first energy storage device with the second energy storage device.

7. The riding lawn mower of claim 6, further comprising:
a charging interface electrically connectable with an external power source; and
a charging unit electrically connecting the first energy storage device and the second energy storage device with the charging interface, the controller configured to control the charging unit to transfer power from the external power source to the first energy storage device and the second energy storage device through the charging interface.

8. The riding lawn mower of claim 7, wherein a ratio of a maximum charging current for the second energy storage device to a maximum charging current for the first energy storage device is greater than or equal to 0.02 and less than or equal to 10.

9. The riding lawn mower of claim 7, wherein the charging unit is configured to charge the first energy storage device to a predefined state before charging the second energy storage device.

10. The riding lawn mower of claim 7, wherein the charging unit is configured to charge the second energy storage device to a first predefined state before charging the first energy storage device to a second predefined state.

11. The riding lawn mower of claim 7, wherein the charging unit has a first charging mode and a second charging mode, in the first charging mode, the charging unit charges either the first energy storage device or the second energy storage device, in the second charging mode, the charging unit charges both the first energy storage device and the second energy storage device.

12. The riding lawn mower of claim 7, wherein the charging unit is a part of the driving circuit.

13. The riding lawn mower of claim 1, further comprising a controller electrically connected with the driving circuit, the controller configured to control the driving circuit to transfer power from at least one of the first energy storage device or the second energy storage device to the driving motor.

14. The riding lawn mower of claim 13, wherein in a first discharging mode, the controller controls the driving circuit to selectively transfer power from the first energy storage device or the second energy storage device based on voltage.

15. The riding lawn mower of claim 13, wherein in a second discharging mode, the controller controls the driving circuit to transfer power from both the first energy storage device and the second energy storage device to the driving motor simultaneously.

16. The riding lawn mower of claim 1, wherein a ratio of a total energy of the second energy storage device to a total energy of the first energy storage device is greater than or equal to 2 and less than or equal to 20.

17. The riding lawn mower of claim 1, wherein an energy density of each of the at least one second energy storage unit is different from an energy density of each of the at least one first energy storage unit.

18. The riding lawn mower of claim 1, wherein the first energy storage device is arranged in front of the second energy storage device.

19. A riding lawn mower, comprising:
a frame;
a seat mounted to the frame;
a wheel assembly comprising at least one wheel supporting the frame;
a motor configured to drive the at least one wheel to rotate;
a cutting assembly comprising at least one cutting piece for cutting grass;
a driving motor configured to drive the cutting assembly;
a first energy storage device configured to supply power to at least one of the motor or the driving motor, the first energy storage device comprising at least one first energy storage unit, the first energy storage device detachably mounted to the frame and enabled to supply power to another power tool when detached from the riding lawn mower;
a second energy storage device configured to supply power to the motor, the second energy storage device comprising at least one second energy storage unit; and
a driving circuit connectable with the first energy storage device and the second energy storage device to transfer power from at least one of the first energy storage device or the second energy storage device to at least one of the motor or the driving motor;
wherein the riding lawn mower further comprises a plurality of different identification terminals engageable with the first energy storage device or the second energy storage device and the riding lawn mower identifies a type of the first energy storage device and the second energy storage device through the plurality of different identification terminals and selectively connects the first energy storage device and the second energy storage device to the driving circuit.

20. The riding lawn mower of claim 19, wherein each of the at least one first energy storage unit and each of the at least one second energy storage unit have different battery chemistries.

21. The riding lawn mower of claim 19, wherein each of the at least one first energy storage unit has a first positive electrode, each of the at least one second energy storage unit has a second positive electrode, and the first positive electrode and the second positive electrode are made from different materials.

22. The riding lawn mower of claim 19, wherein the plurality of different identification terminals comprises at least one first identification terminal engageable with the second energy storage device and at least one second identification terminal engageable with the first energy storage device.

23. The riding lawn mower of claim 19, wherein a nominal voltage of the second energy storage device is equal to a nominal voltage of the first energy storage device.

24. The riding lawn mower of claim 19, further comprising a controller electrically connected with the driving circuit, the controller configured to control the driving circuit to transfer power from at least one of the first energy storage device or the second energy storage device to the driving motor.

25. The riding lawn mower of claim 24, wherein in a first discharging mode, the controller controls the driving circuit to selectively transfer power from the first energy storage device or the second energy storage device based on voltage.

26. The riding lawn mower of claim 24, wherein in a second discharging mode, the controller controls the driving circuit to transfer power from both the first energy storage device and the second energy storage device to the driving motor simultaneously.

27. The riding lawn mower of claim 19, wherein a ratio of a total energy of the second energy storage device to a total energy of the first energy storage device is greater than or equal to 2 and less than or equal to 20.

28. The riding lawn mower of claim 19, wherein an energy density of each of the at least one second energy storage unit is different from an energy density of each of the at least one first energy storage unit.

29. The riding lawn mower of claim 19, wherein the first energy storage device is arranged in front of the second energy storage device.

\* \* \* \* \*